United States Patent
Saito et al.

(10) Patent No.: US 9,316,818 B2
(45) Date of Patent: *Apr. 19, 2016

(54) ZOOM LENS AND IMAGING APPARATUS

(71) Applicant: FUJIFILM Corporation, Tokyo (JP)

(72) Inventors: Hiroki Saito, Saitama-ken (JP); Michio Cho, Saitama-ken (JP); Toru Ito, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,409

(22) Filed: Feb. 5, 2014

(65) Prior Publication Data

US 2014/0153106 A1 Jun. 5, 2014

Related U.S. Application Data

(63) Continuation of application No. PCT/JP2012/005374, filed on Aug. 28, 2012.

(30) Foreign Application Priority Data

Aug. 29, 2011 (JP) ................................. 2011-185746

(51) Int. Cl.
 *G02B 13/04* (2006.01)
 *G02B 15/16* (2006.01)
 (Continued)

(52) U.S. Cl.
 CPC .............. *G02B 13/04* (2013.01); *G02B 13/009* (2013.01); *G02B 13/18* (2013.01); *G02B 15/16* (2013.01); *G02B 15/161* (2013.01); *G02B 15/163* (2013.01); *G02B 15/177* (2013.01)

(58) Field of Classification Search
 CPC .. G02B 13/009; G02B 15/161; G02B 15/163; G02B 15/177

USPC .......................... 359/680, 682, 686, 689, 691
See application file for complete search history.

(56) References Cited

U.S. PATENT DOCUMENTS 4,540,249 A   9/1985   Mogami
6,169,635 B1   1/2001   Ozaki et al.
(Continued)

FOREIGN PATENT DOCUMENTS

JP   58-005707   1/1983
JP   04-163414   6/1992
(Continued)

OTHER PUBLICATIONS

International Search Report, PCT/JP2012/005374, Dec. 11, 2012.
(Continued)

*Primary Examiner* — Darryl J Collins
(74) *Attorney, Agent, or Firm* — Young & Thompson

(57) ABSTRACT

In a zoom lens in which a first lens group having a negative refractive power and a second lens group having a positive refractive power are disposed in order from the object side and zooming is performed by moving the first and the second lens groups, the first lens group is formed of a first lens having a negative refractive power, a second lens, a third lens having a negative refractive power, and a fourth lens having a positive refractive power. Then, when the focal length of the second lens, the focal length of the entire system at the wide angle end, the focal length of the first lens group, and the focal length of the second lens group are taken as $f_{G12}$, fw, $f_1$, and $f_2$ respectively, the zoom lens is configured to satisfy conditional expressions give below:

$$0.00 < fw/f_2 < 0.50 \quad (1\text{-}1); \text{ and}$$

$$-0.19 < f_1/f_{G12} < 0.16 \quad (2\text{-}1).$$

18 Claims, 13 Drawing Sheets

(51) Int. Cl.
*G02B 15/177* (2006.01)
*G02B 13/00* (2006.01)
*G02B 15/163* (2006.01)
*G02B 13/18* (2006.01)

(56) References Cited

U.S. PATENT DOCUMENTS

| | | |
|---|---|---|
| 6,940,655 B2 | 9/2005 | Sato |
| 7,046,454 B2 | 5/2006 | Tomioka |
| 2002/0176177 A1 | 11/2002 | Takatsuki |
| 2005/0078380 A1* | 4/2005 | Tomioka ............... 359/680 |
| 2006/0077565 A1 | 4/2006 | Tomioka |
| 2008/0106801 A1* | 5/2008 | Kang et al. ............ 359/691 |
| 2008/0285146 A1* | 11/2008 | Shirasuna ............. 359/686 |
| 2009/0219627 A1 | 9/2009 | Tomioka |

FOREIGN PATENT DOCUMENTS

| | | |
|---|---|---|
| JP | 11-223768 | 8/1999 |
| JP | 2002-277737 | 9/2002 |
| JP | 2005-134887 | 5/2005 |
| JP | 2006-091643 | 4/2006 |
| JP | 2008-065051 | 3/2008 |
| JP | 2008-116915 | 5/2008 |
| JP | 2009-205055 | 9/2009 |

OTHER PUBLICATIONS

Chinese Office Action dated Aug. 5, 2015, with English Translation; Application No. 201280041656.7.

* cited by examiner

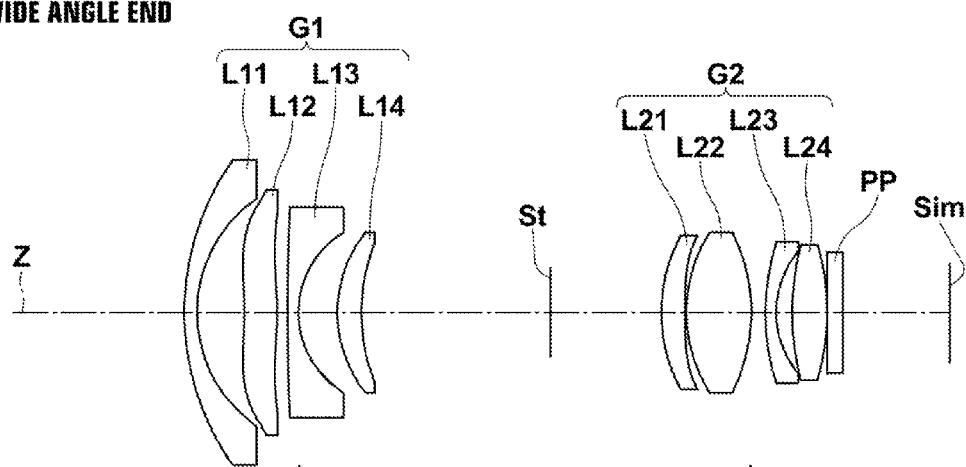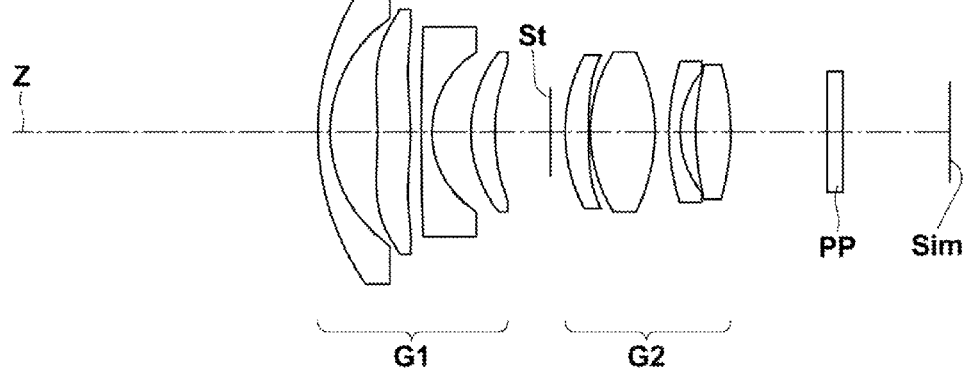

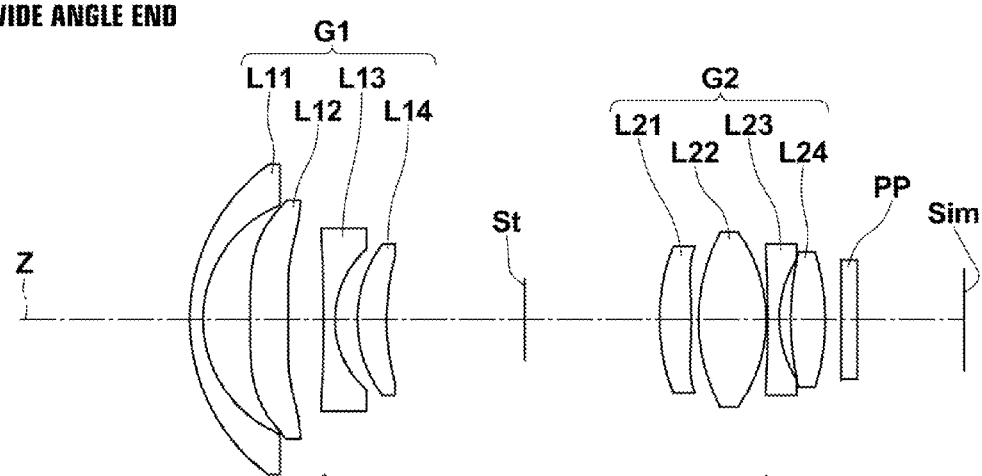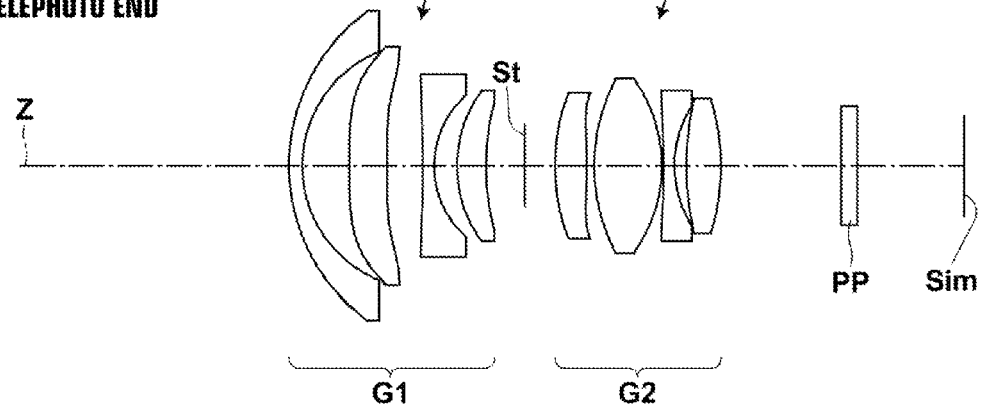

FIG.3
EXAMPLE 3
A WIDE ANGLE END
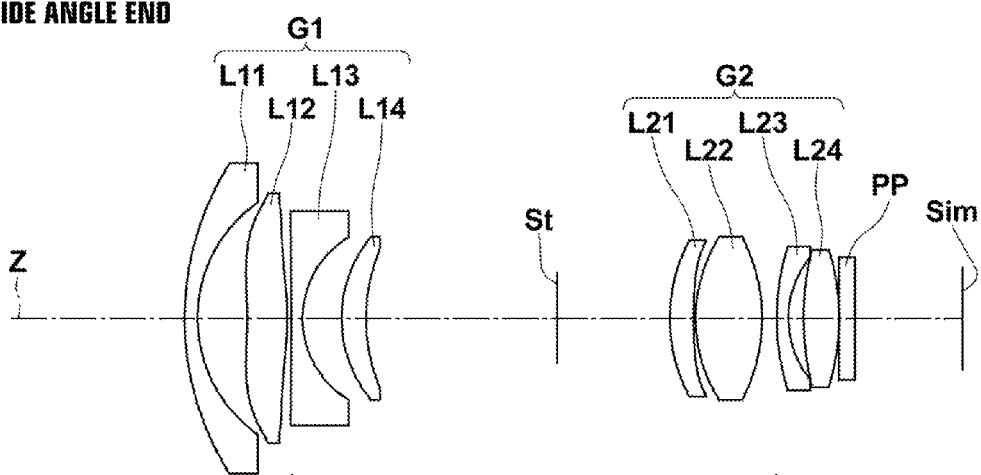
B TELEPHOTO END
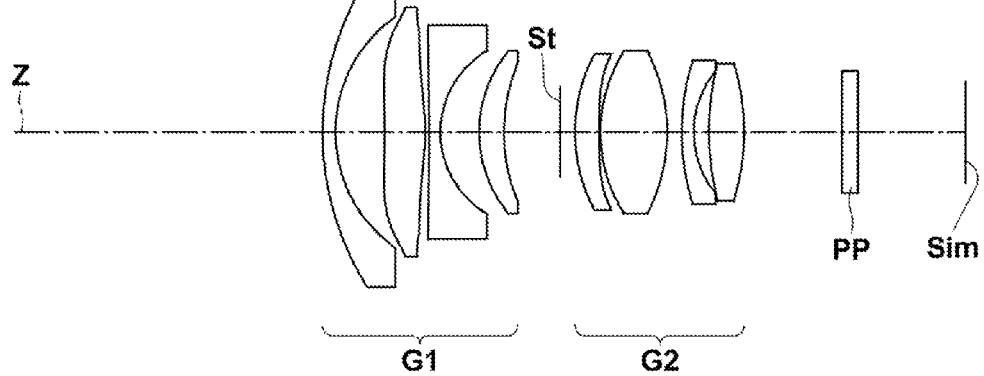

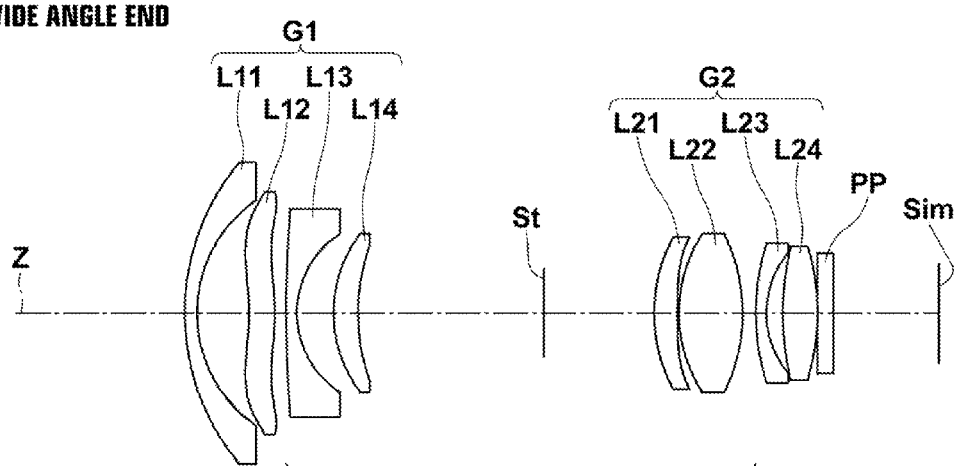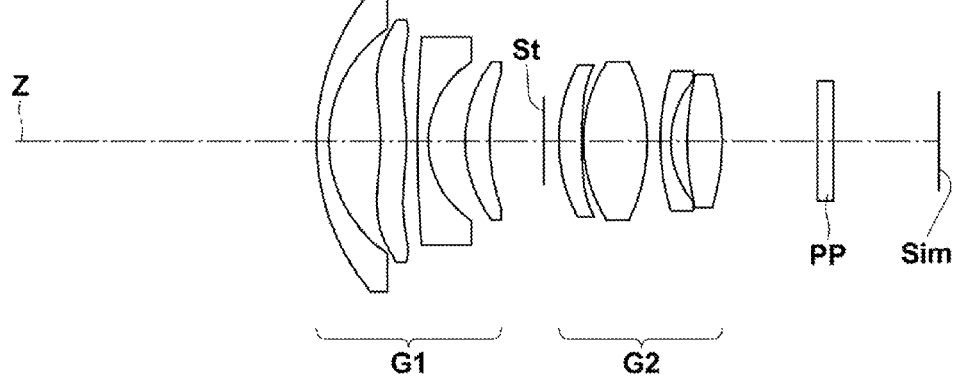

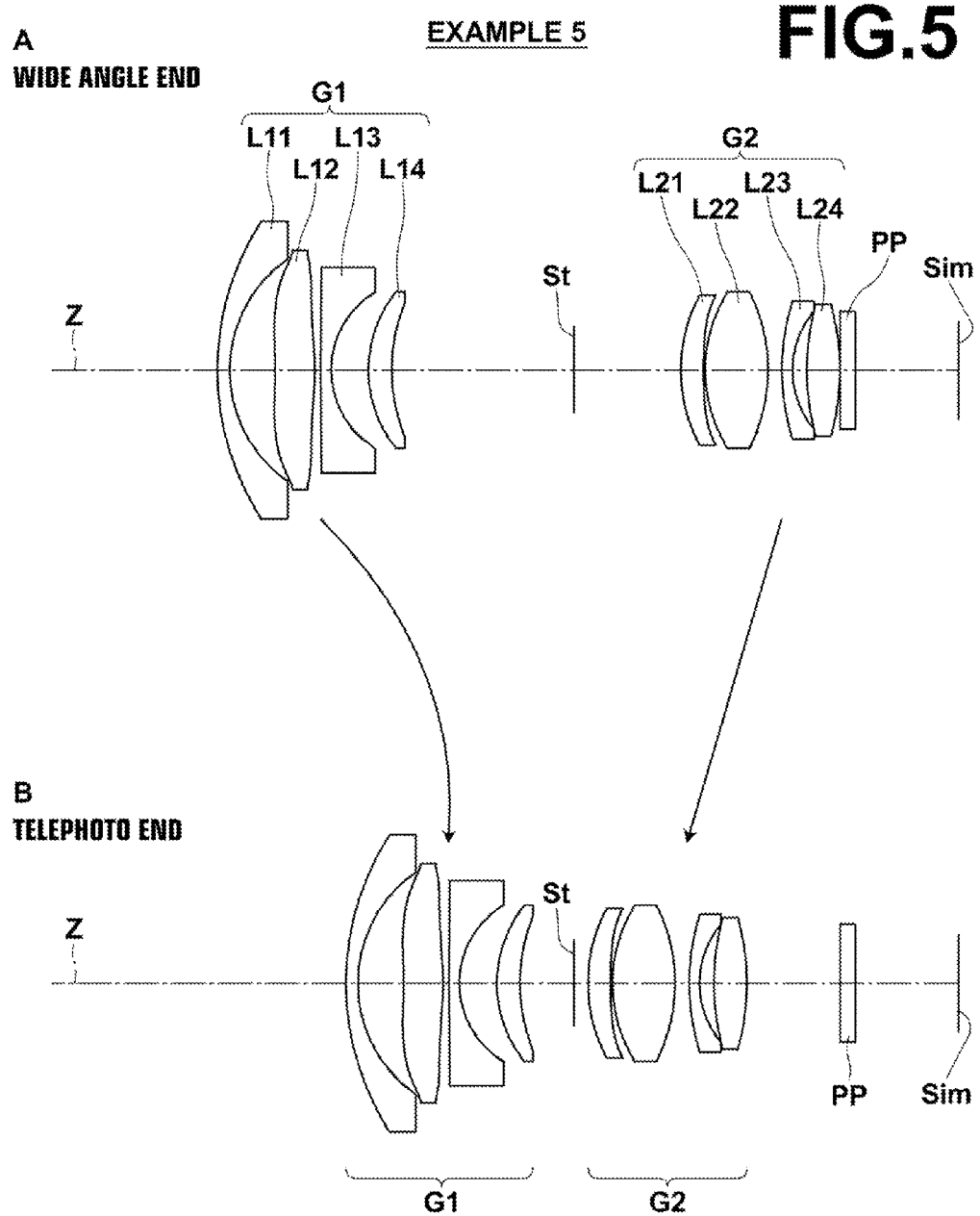

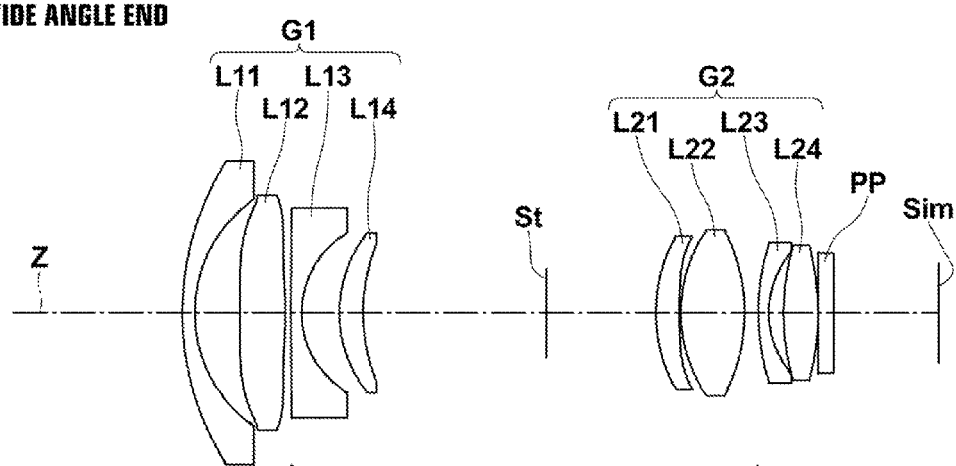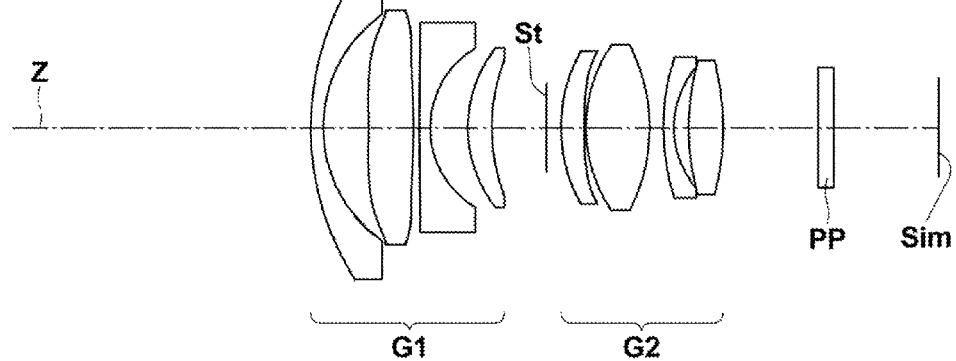

FIG.7
EXAMPLE 1
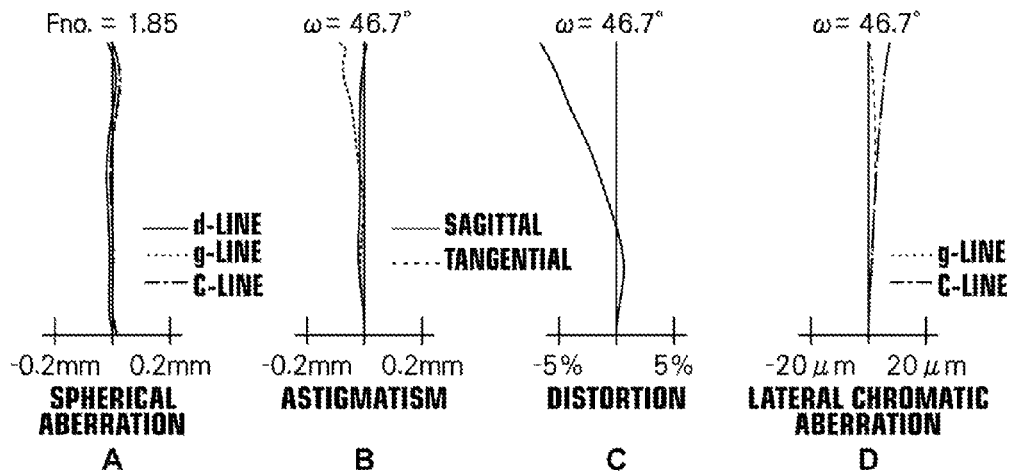
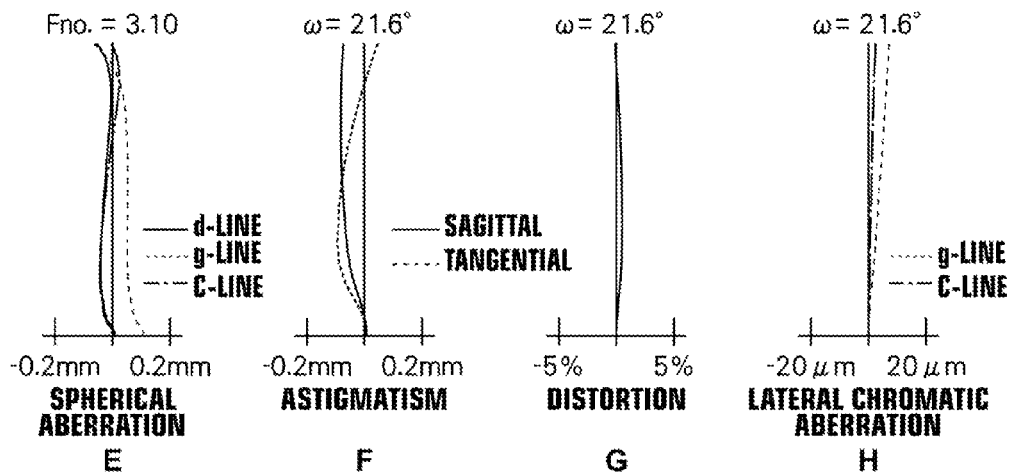

FIG.8
EXAMPLE 2
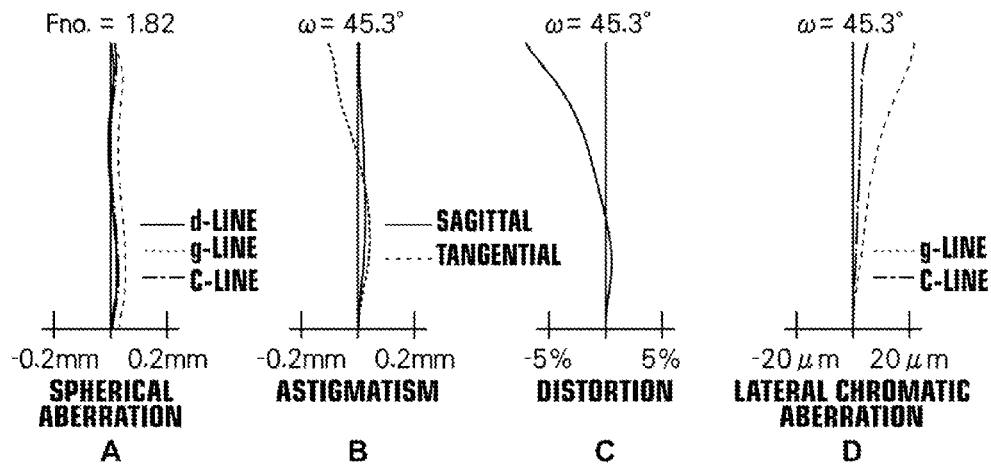
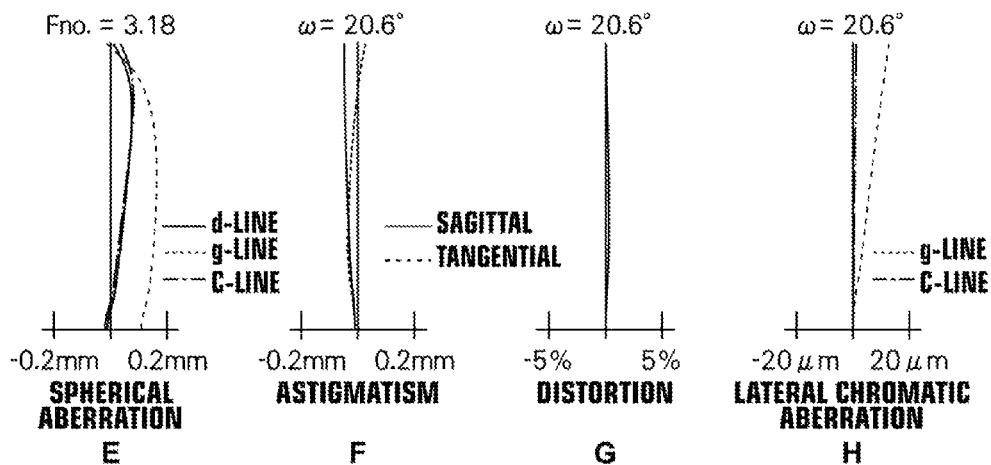

FIG.9
EXAMPLE 3
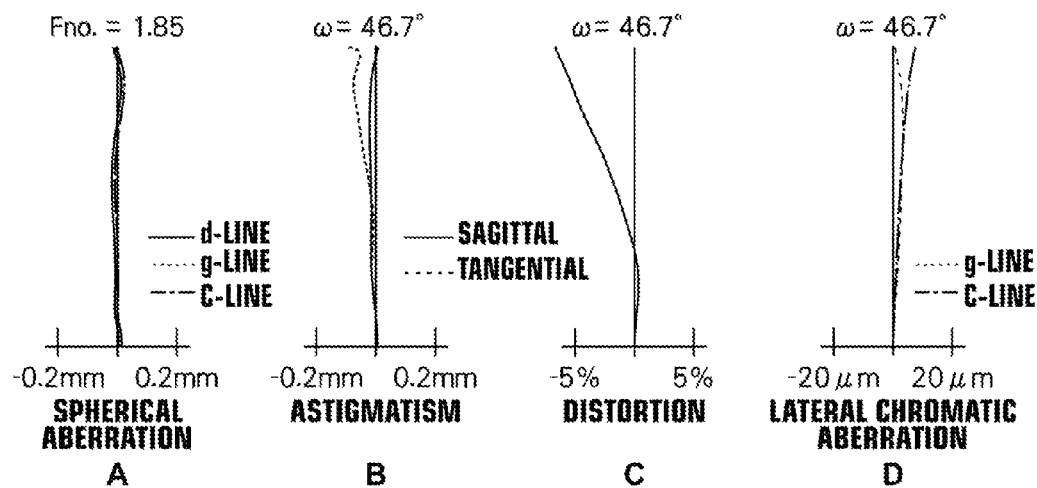
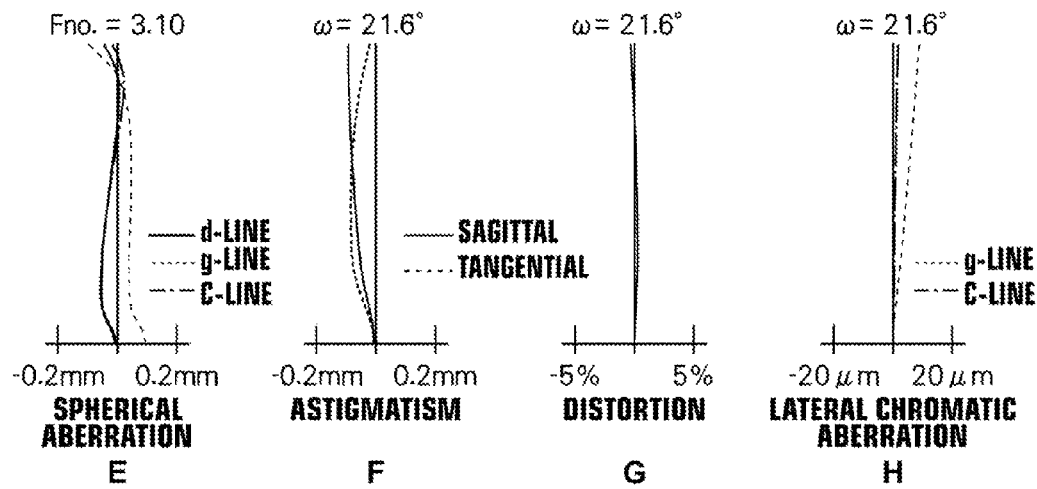

FIG.10
EXAMPLE 4
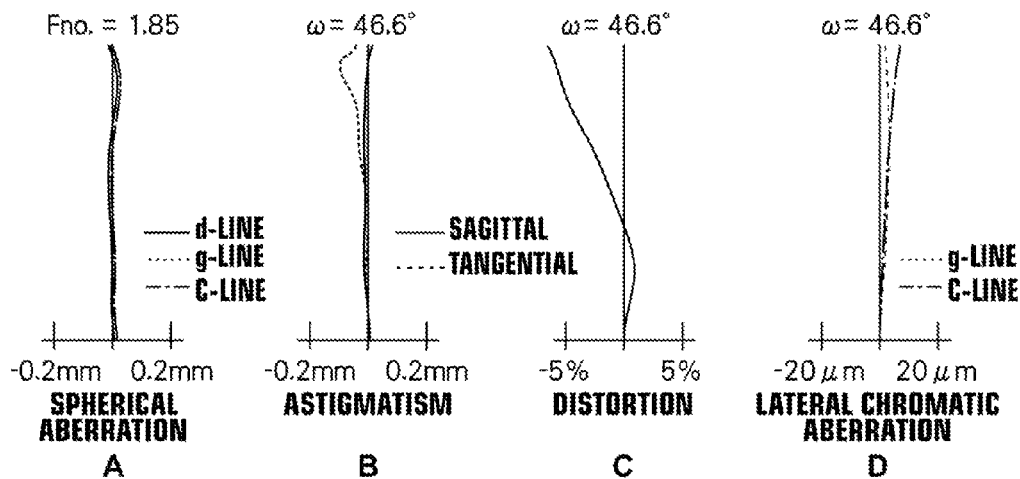
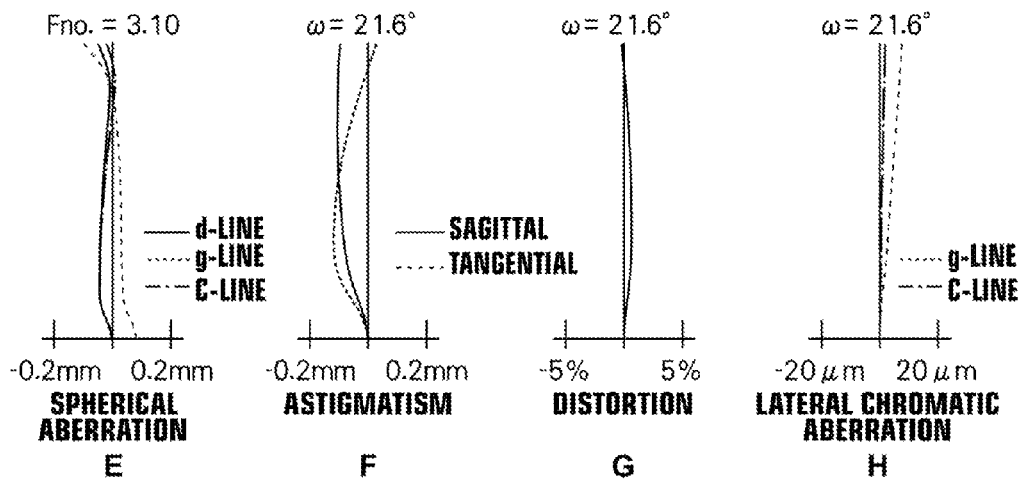

FIG.11
EXAMPLE 5
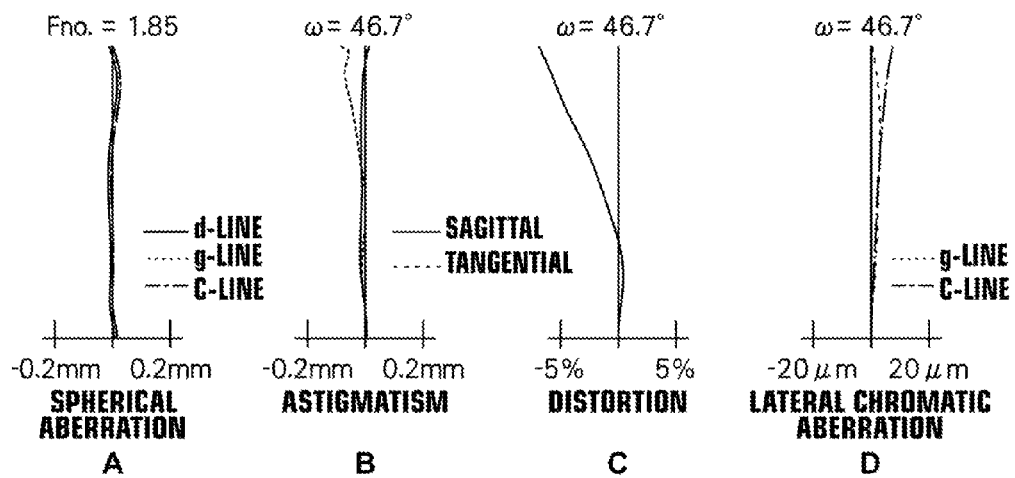
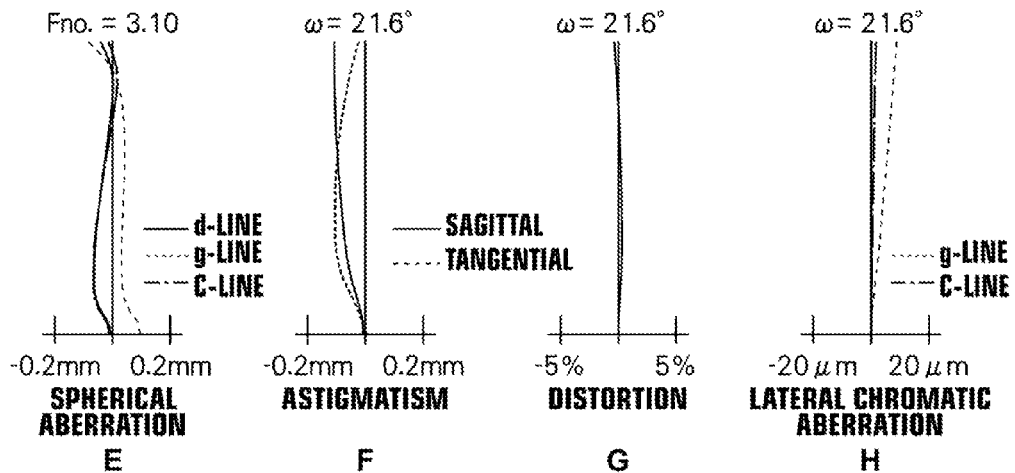

FIG.12
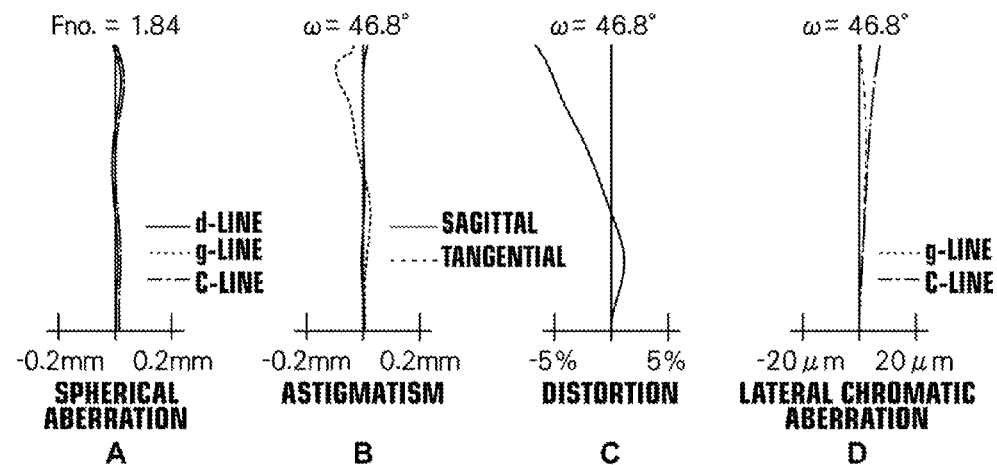
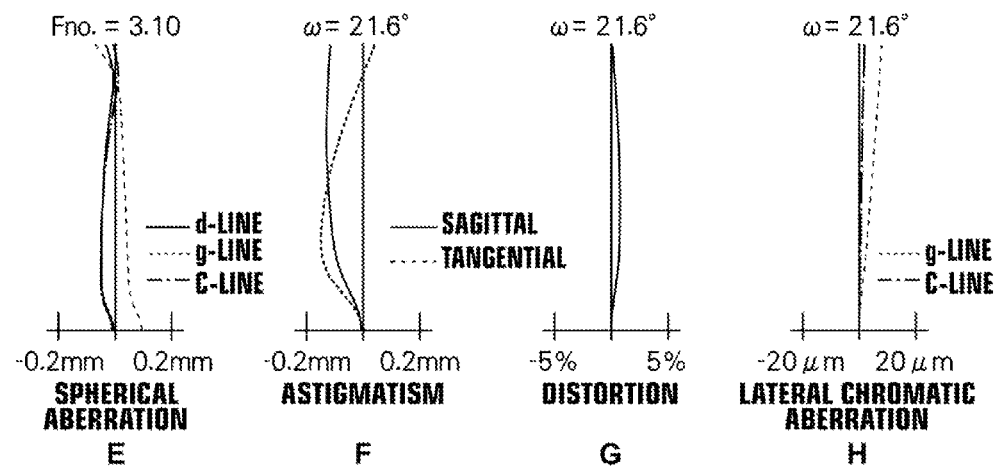

ZOOM LENS AND IMAGING APPARATUS

CROSS REFERENCE TO RELATED APPLICATIONS

This application is a continuation of PCT/JP2012/005374 filed on Aug. 28, 2012, which claims foreign priority to Japanese Application No. 2011-185746 filed on Aug. 29, 2011. The entire contents of each of the above applications are hereby incorporated by reference.

TECHNICAL FIELD

The present invention relates to a zoom lens and more particularly to a zoom lens favorably used for small video cameras and the like.

The invention also relates to an imaging apparatus provided with such a zoom lens.

BACKGROUND ART

Heretofore, as one of the wide angle zoom lenses with a zoom ratio of about 2.5, a two-group type zoom lens formed of a first lens group having a negative refractive power and a second lens group having a positive refractive power disposed in order from the object side in which zooming is performed by moving the first and the second lens groups in optical axis directions is known. This type of zoom lens is favorably used for small video cameras and the like.

For example, Japanese Unexamined Patent Publication No. 2008-116915 describes a two-group type zoom lens in which the first lens group is formed of four lenses, i.e., a negative lens (lens having a negative refractive power), a negative lens, a negative lens, and a positive lens (lens having a positive refractive power) disposed in order from the object side (Example 2).

U.S. Pat. No. 6,940,655 describes a two-group type zoom lens in which the first lens group is formed of four lenses, i.e., a negative lens, a positive lens, a negative lens, and a positive lens disposed in order from the object side (Example 1).

Further, U.S. Patent Application Publication No. 20060077565 describes a two-group type zoom lens in which the first lens group is formed of four lenses, i.e., a negative lens, a negative lens, a negative lens, and a positive lens disposed in order from the object side and the second lens group is also formed of four lenses, i.e., a positive lens, a positive lens, a negative lens, and a positive lens disposed in order from the object side (Example 2). Still further, Japanese Unexamined Patent Publication No. 2008-065051 describes a zoom lens having a similar lens configuration to that described above (Example 4), and U.S. Pat. No. 7,046,454 also describes a zoom lens having a similar lens configuration to that described above (Example 1).

In the mean time, U.S. Pat. No. 6,169,635 describes a two-group type zoom lens in which the first lens group is formed of four lenses, i.e., a negative lens, a positive lens, a negative lens, and a positive lens disposed in order from the object side and the second lens group is also formed of four lenses, i.e., a positive lens, a positive lens, a negative lens, and a positive lens disposed in order from the object side (Example 4).

DISCLOSURE OF THE INVENTION

The zoom lenses described above have the following problems. That is, the zoom lens described in Japanese Unexamined Patent Publication No. 2008-116915 has a wide angle of view but the zoom ratio is small, the zoom lens described in U.S. Pat. No. 6,940,655 has a wide angle of view but the zoom ratio is small and the F-number is large, the zoom lens described in U.S. Patent Application Publication No. 20060077565 has a wide angle of view with a large zoom ratio but the distortion aberration is large, the zoom lenses described in Japanese Unexamined Patent Publication No. 2008-065051 and U.S. Pat. No. 7,046,454 have a wide angle of view with a large zoom ratio but there is still room for improvement in the distortion aberration, and the zoom lens described in U.S. Pat. No. 6,169,635 has a narrow angle of view with a large F-number.

The present invention has been developed in view of the circumstances described above, and it is an object of the present invention to provide a zoom lens having a small F-number with well corrected aberrations.

It is a further object of the present invention to provide an imaging apparatus having satisfactory optical performance with a reduced size by the use of the zoom lens as described above.

A first zoom lens according to the present invention is a zoom lens substantially consisting of a first lens group having a negative refractive power and a second lens group having a positive refractive power, disposed in order from the object side, wherein:

zooming is performed by moving the first lens group and the second lens group;

the first lens group is substantially composed of a first lens having a negative refractive power, a second lens, a third lens having a negative refractive power, and a fourth lens having a positive refractive power; and when the focal length of the second lens from the object side in the first lens group is taken as $f_{G12}$, the focal length of the entire system at the wide angle end is taken as fw, the focal length of the first lens group is taken as $f_1$, and the focal length of the second lens group is taken as $f_2$, the zoom lens satisfies conditional expressions given below:

$$0.00 < fw/f_2 < 0.50 \quad (1\text{-}1); \text{ and}$$

$$-0.19 < f_1/f_{G12} < 0.16 \quad (2\text{-}1).$$

The term "substantially consisting of a first lens group and a second lens group" as used herein refers to include the case in which a lens having substantially no refractive power, an optical element other than a lens, such as an aperture stop, a cover glass, and the like, a lens flange, a lens barrel, an image sensor, a mechanical component, such as a camera shake correction mechanism, and the like, are included in addition to the lens groups. In this respect, the same applies to the description of "the first lens group is substantially composed of a first lens having a negative refractive power, a second lens, a third lens having a negative refractive power, and a fourth lens having a positive refractive power" and description with respect to the second lens group of "the second lens group is substantially composed of four lenses" to be discussed herein below.

In the zoom lens of the present invention, a cemented lens may be used for a lens constituting each lens group and in the case where the cemented lens is formed of n lenses cemented together, the cemented lens is counted as n lenses. Note that the term "zoom lens of the present invention" or "zoom lens according to the present invention" as used herein refers to include all of the first zoom lens, and second and third zoom lenses to be described later, unless otherwise specifically described.

In the zoom lens of the present invention, the surface shape and the sign of the refractive power of a lens are considered within the paraxial region if an aspherical surface is included.

The first zoom lens according to the present invention preferably satisfies, in particular, at least either one of conditional expressions given below within each range defined by the conditional expressions (1-1) and (2-1):

$$0.20 < fw/f_2 < 0.43 \quad (1\text{-}2); \text{ and}$$

$$-0.15 < f_1/f_{G12} < 0.10 \quad (2\text{-}2).$$

Further, the first zoom lens according to the present invention more preferably satisfies, in particular, a conditional expression given below within the range defined by the conditional expression (1-1) described above:

$$0.31 < fw/f_2 < 0.35 \quad (1\text{-}3).$$

A second zoom lens according to the present invention is a zoom lens substantially consisting of a first lens group having a negative refractive power and a second lens group having a positive refractive power, disposed in order from the object side, wherein:

zooming is performed by moving the first lens group and the second lens group;

the first lens group is substantially composed of a first lens having a negative refractive power, a second lens, a third lens having a negative refractive power, and a fourth lens having a positive refractive power;

the second lens group is substantially composed of four lenses; and when the focal length of the second lens from the object side in the first lens group is taken as $f_{G12}$, the focal length of the entire system at the wide angle end is taken as fw, the focal length of the first lens group is taken as $f_1$, and the focal length of the second lens group is taken as $f_2$, the zoom lens satisfies conditional expressions given below:

$$0.00 < fw/f_2 < 0.43 \quad (1\text{-}4); \text{ and}$$

$$-1.00 < f_1/f_{G12} < 0.16 \quad (2\text{-}3).$$

The second zoom lens according to the present invention preferably satisfies at least either one of conditional expressions given below within each range defined by the conditional expressions (1-4) and (2-3):

$$0.20 < fw/f_2 < 0.43 \quad (1\text{-}2); \text{ and}$$

$$-0.50 < f_1/f_{G12} < 0.10 \quad (2\text{-}4).$$

The second zoom lens according to the present invention preferably satisfies at least either one of conditional expressions given below within each range defined by the conditional expressions (1-4) and (2-3) described above:

$$0.31 < fw/f_2 < 0.35 \quad (1\text{-}3); \text{ and}$$

$$-0.15 < f_1/f_{G12} < 0.10 \quad (2\text{-}2).$$

A third zoom lens according to the present invention is a zoom lens substantially consisting of a first lens group having a negative refractive power and a second lens group having a positive refractive power disposed in order from the object side, wherein:

zooming is performed by moving the first lens group and the second lens group;

the first lens group is substantially composed of a first lens having a negative refractive power, a second lens, a third lens having a negative refractive power, and a fourth lens having a positive refractive power;

the second lens group is substantially composed of four lenses; and when the focal length of the second lens from the object side in the first lens group is taken as $f_{G12}$, the focal length of the entire system at the wide angle end is taken as fw, the focal length of the first lens group is taken as $f_1$, and the focal length of the second lens group is taken as $f_2$, the zoom lens satisfies conditional expressions given below:

$$0.27 < fw/f_2 < 0.43 \quad (1\text{-}5); \text{ and}$$

$$-1.00 < f_1/f_{G12} < 0.29 \quad (2\text{-}5).$$

The third zoom lens according to the present invention preferably satisfies at least either one of conditional expressions given below within each range defined by the conditional expressions (1-5) and (2-5):

$$0.31 < fw/f_2 < 0.35 \quad (1\text{-}3); \text{ and}$$

$$-0.50 < f_1/f_{G12} < 0.29 \quad (2\text{-}6).$$

The third zoom lens according to the present invention preferably satisfies a conditional expression given below within the range defined by the conditional expression (2-6) described above:

$$-0.15 < f_1/f_{G12} < 0.10 \quad (2\text{-}2).$$

In the mean time, an imaging apparatus according to the present invention includes any of the foregoing zoom lenses according to the present invention.

The first zoom lens according to the present invention may inhibit increase in aberrations accompanied by increase in the angle of view while preventing cost increase by forming the first lens group with four lenses in which a first lens having a negative refractive power, a second lens, a third lens having a negative refractive power, and a fourth lens having a positive refractive power are disposed in order from the object side.

Further, the first zoom lens according to the present invention has the following advantageous effects by satisfying the conditional expression (1-1) described above. The conditional expression (1-1) defines the relationship between the focal length of the entire system at the wide angle end and the focal length of the second lens group. If the first zoom lens exceeds the upper limit value of the conditional expression (1-1), the refractive power of the second lens group becomes too strong and satisfactory correction of aberrations over the entire zoom range becomes difficult, which is undesirable. In the case where the first zoom lens satisfies the conditional expression (1-1), the foregoing disadvantages are prevented and aberrations may be corrected satisfactorily over the entire zoom range.

The foregoing advantageous effects become more significant if the first zoom lens satisfies the conditional expression (1-2) within the range defined by the conditional expression (1-1), and still more significant if the first zoom lens satisfies the conditional expression (1-3).

If the first zoom lens falls below the lower limit value of the conditional expression (1-2), the refractive power of the second lens group becomes weak and the amount of movement of the second lens group is increased at the time of zooming, thereby resulting in an extended overall length of the entire optical system and downsizing becomes difficult, which is undesirable. In the case where the first zoom lens satisfies the conditional expression (1-2), the foregoing disadvantages are prevented and downsizing of the entire optical system may be achieved. This holds true also in the case where the first zoom lens satisfies the conditional expression (1-3).

Still further, the first zoom lens according to the present invention has the following advantageous effects by satisfying the conditional expression (2-1). The conditional expression (2-1) defines the relationship between the focal length of the first lens group and the focal length of the second lens in the first lens group. If the first zoom lens falls below the lower limit value of the conditional expression (2-1), the positive refractive power of the second lens becomes strong and the refractive power of a lens having a negative refractive power in the first lens group becomes too strong in order to compensate for this, whereby correction of aberrations becomes difficult, which is undesirable. Contrary to this, if the first zoom lens exceeds the upper limit value of the conditional expression (2-1), the negative refractive power of the second lens becomes too strong and correction of distortion aberration becomes difficult, which is undesirable. In the case where the first zoom lens satisfies the conditional expression (2-1), the foregoing disadvantages are prevented and distortion aberration and other aberrations may be corrected satisfactorily.

The foregoing advantageous effects become more significant if the first zoom lens satisfies the conditional expression (2-2) within the range defined by the conditional expression (2-1).

The second zoom lens according to the present invention may inhibit increase in aberrations accompanied by increase in the angle of view while preventing cost increase by forming the first lens group with four lenses in which a first lens having a negative refractive power, a second lens, a third lens having a negative refractive power, and a fourth lens having a positive refractive power are disposed in order from the object side, as in the first zoom lens. Further, the second zoom lens may inhibit variation in aberration due to zooming while preventing cost increase by forming the second lens group with four lenses.

Further, the second zoom lens according to the present invention has the following advantageous effects by satisfying the conditional expression (1-4). The conditional expression (1-4) defines the relationship between the focal length of the entire system at the wide angle end and the focal length of the second lens group, as in the conditional expression (1-1). If the second zoom lens exceeds the upper limit of the conditional expression (1-4), the refractive power of the second lens group becomes too strong and satisfactory correction of aberrations over the entire zoom range becomes difficult, which is undesirable. In the case where the second zoom lens satisfies the conditional expression (1-4), the foregoing disadvantages are prevented and aberrations may be corrected satisfactorily over the entire zoom range.

The foregoing advantageous effects become more significant if the second zoom lens satisfies the conditional expression (1-2) within the range defined by the conditional expression (1-4), and still more significant if the second zoom lens satisfies the conditional expression (1-3).

If the second zoom lens falls below the lower limit value of the conditional expression (1-2), the refractive power of the second lens group becomes weak and the amount of movement of the second lens group is increased at the time of zooming, thereby resulting in an extended overall length of the entire optical system and downsizing becomes difficult, which is undesirable. In the case where the second zoom lens satisfies the conditional expression (1-2), the foregoing disadvantages are prevented and downsizing of the entire optical system may be achieved. This holds true also in the case where the second zoom lens satisfies the conditional expression (1-3).

Still further, the second zoom lens according to the present invention has the following advantageous effects by satisfying the conditional expression (2-3). The conditional expression (2-3) defines the relationship between the focal length of the first lens group and the focal length of the second lens in the first lens group, as in the conditional expression (2-1). If the second zoom lens falls below the lower limit value of the conditional expression (2-3), the positive refractive power of the second lens becomes strong and the refractive power of a lens having a negative refractive power in the first lens group becomes too strong in order to compensate for this, whereby correction of aberrations becomes difficult, which is undesirable. Contrary to this, if the second zoom lens exceeds the upper limit value of the conditional expression (2-3), the negative refractive power of the second lens becomes too strong and correction of distortion aberration becomes difficult, which is undesirable. In the case where the second zoom lens satisfies the conditional expression (2-3), the foregoing disadvantages are prevented and distortion aberration and other aberrations may be corrected satisfactorily.

The foregoing advantageous effects become more significant if the second zoom lens satisfies the conditional expression (2-4) within the range defined by the conditional expression (2-3), and still more significant if the second zoom lens satisfies the conditional expression (2-2).

The third zoom lens according to the present invention may inhibit increase in aberrations accompanied by increase in the angle of view while preventing cost increase by forming the first lens group with four lenses in which a first lens having a negative refractive power, a second lens, a third lens having a negative refractive power, and a fourth lens having a positive refractive power are disposed in order from the object side. Further, the third zoom lens may inhibit variation in aberration due to zooming while preventing cost increase by forming the second lens group with four lenses.

Further, the third zoom lens according to the present invention has the following advantageous effects by satisfying the conditional expression (1-5). The conditional expression (1-5) defines the relationship between the focal length of the entire system at the wide angle end and the focal length of the second lens group, as in the conditional expression (1-1). If the third zoom lens falls below the lower limit value of the conditional expression (1-5), the refractive power of the second lens group becomes weak and the amount of movement of the second lens group is increased at the time of zooming, thereby resulting in an extended overall length of the entire optical system and downsizing becomes difficult, which is undesirable. Contrary to this, if the third zoom lens exceeds the upper limit value of the conditional expression (1-5), the refractive power of the second lens group becomes too strong and satisfactory correction of aberrations over the entire zoom range becomes difficult, which is undesirable. In the case where the second zoom lens satisfies the conditional expression (1-5), the foregoing disadvantages are prevented and aberrations may be corrected satisfactorily over the entire zoom range.

The foregoing advantageous effects become more significant if the third zoom lens satisfies, in particular, the conditional expression (1-3) within the range defined by the conditional expression (1-5).

Still further, the third zoom lens according to the present invention has the following advantageous effects by satisfying the conditional expression (2-5). The conditional expression (2-5) defines the relationship between the focal length of the first lens group and the focal length of the second lens in the first lens group, as in the conditional expression (2-1). If the third zoom lens falls below the lower limit value of the conditional expression (2-5), the positive refractive power of the second lens becomes strong and the refractive power of a lens having a negative refractive power in the first lens group becomes too strong in order to compensate for this, whereby correction of aberrations becomes difficult, which is undesirable. Contrary to this, if the third zoom lens exceeds the upper limit value of the conditional expression (2-5), the negative refractive power of the second lens becomes too strong and correction of distortion aberration becomes difficult, which is undesirable. In the case where the third zoom lens satisfies the conditional expression (2-5), the foregoing disadvantages are prevented and distortion aberration and other aberrations may be corrected satisfactorily.

The foregoing advantageous effects become more significant if the third zoom lens satisfies, in particular, the conditional expression (2-6) within the range defined by the conditional expression (2-5), and still more significant if the third zoom lens satisfies the conditional expression (2-2).

The zoom lens of the present invention may have a sufficiently small F-number, as specifically illustrated in numerical examples to be described later.

In the mean time, the imaging apparatus according to the present invention may have favorable optical performance with a reduced size, as the apparatus includes the zoom lens of the present invention having the foregoing advantageous effects.

BRIEF DESCRIPTION OF DRAWINGS

FIG. 1 is a cross-sectional view of a zoom lens according to Example 1 of the present invention, illustrating the lens configuration thereof.

FIG. 2 is a cross-sectional view of a zoom lens according to Example 2 of the present invention, illustrating the lens configuration thereof.

FIG. 3 is a cross-sectional view of a zoom lens according to Example 3 of the present invention, illustrating the lens configuration thereof.

FIG. 4 is a cross-sectional view of a zoom lens according to Example 4 of the present invention, illustrating the lens configuration thereof.

FIG. 5 is a cross-sectional view of a zoom lens according to Example 5 of the present invention, illustrating the lens configuration thereof.

FIG. 6 is a cross-sectional view of a zoom lens according to Example 6 of the present invention, illustrating the lens configuration thereof.

FIG. 7 shows aberration diagrams A to H of the zoom lens according to Example 1 of the present invention.

FIG. 8 shows aberration diagrams A to H of the zoom lens according to Example 2 of the present invention.

FIG. 9 shows aberration diagrams A to H of the zoom lens according to Example 3 of the present invention.

FIG. 10 shows aberration diagrams A to H of the zoom lens according to Example 4 of the present invention.

FIG. 11 shows aberration diagrams A to H of the zoom lens according to Example 5 of the present invention.

FIG. 12 shows aberration diagrams A to H of the zoom lens according to Example 6 of the present invention.

BEST MODE FOR CARRYING OUT THE INVENTION

Figure 13:
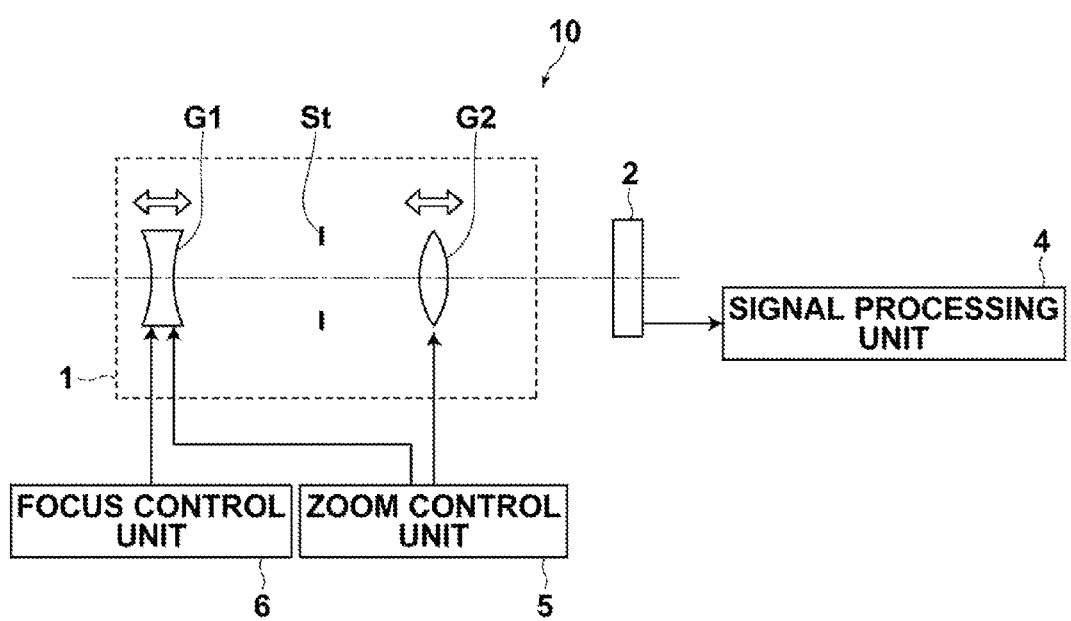
FIG. 13 is a schematic configuration diagram of an imaging apparatus according to an embodiment of the present invention.

Hereinafter, embodiments of the present invention will be described in detail with reference to the accompanying drawings. FIG. 1 is a cross-sectional view of a zoom lens according to an embodiment of the present invention, illustrating a configuration example, which corresponds to a zoom lens of Example 1 to be described later. FIGS. 2 to 6 are cross-sectional views, illustrating other configuration examples, each corresponding to each of zoom lenses of Example 2 to 6. The basic configurations of the examples illustrated in FIGS. 1 to 6 are identical to each other, except for a particularly described difference, and the methods of illustration are also identical, so that the zoom lens according to an embodiment of the present invention will be described mainly with reference to FIG. 1.

In FIG. 1, the left side is the object side and the right side is the image side, in which the diagram A illustrates the arrangement of the optical system in infinity focusing state at the wide angle end (state of the shortest focal length) while the diagram B illustrates the arrangement of the optical system in infinity focusing state at the telephoto end (state of the longest focal length). Note that the same applies to FIGS. 2 to 6, to be described later.

The zoom lens according to an embodiment of the present invention is formed of a first lens group G1 having a negative refractive power and a second lens group G2 having a positive refractive power disposed in order from the object side as lens groups. Further, a fixed aperture stop St, which does not move during zooming, is disposed between the first lens group G1 and the second lens group G2. The aperture stop St shown here does not necessarily represent the size and shape but rather indicates the position on the optical axis Z.

Note that FIG. 1 illustrates an example in which a parallel plate optical member PP is disposed between the second lens group G2 and the image plane Sim. When applying the zoom lens to an imaging apparatus, it is preferable that a cover glass and various types of filters, such as a low-pass filter, an infrared cut filter, and the like, are disposed between the optical system and the image plane Sim according to the structure on the camera side on which the zoom lens is mounted. The optical member PP represents such a cover glass and various types of filters. Further, some imaging devices in recent years employ a three-CCD system that uses a CCD for each color in order to improve image quality, and a color separation optical system, such as a color separation prism or the like, will be inserted between the lens system and the image plane Sim in order to accommodate the three-CCD system. If that is the case, the color separation optical system may be disposed at the position of the optical member PP.

The zoom lens is formed such that, upon zooming from the wide angle end to the telephoto end, the first lens group G1 is moved to the side of the image plane Sim so as to draw a convex trajectory while the second lens group G2 is moved monotonically to the object side. FIG. 1 schematically illustrates the movement trajectories of the first lens group G1 and second lens group G2 upon zooming from the wide angle end to the telephoto end by solid lines between the diagrams A and B.

The first lens group G1 is formed of four lenses in which a first lens L11 having a negative refractive power, a second lens L12 having a positive refractive power, a third lens L13 having a negative refractive power, and a fourth lens L14 having a positive refractive power are disposed in order from the object side. Here, for example, the first lens L11 may have a negative meniscus shape, the second lens L12 may have an aspherical shape on both the object side surface and the image side surface, the third lens L13 may have a negative meniscus shape, and the fourth lens L14 may have a positive meniscus shape, as in the example shown in FIG. 1. Note that a lens having a negative refractive power is used as the second lens L12 particularly in Example 4.

The object side surface of the second lens L12 is formed in an aspherical surface with a concave surface on the object side in the paraxial region. Further, at least either one of the object side surface and the image side surface (both surfaces in the example of FIG. 1) is formed in an aspherical surface having at least one inflection point on the surface from the center to the effective diameter. Note that, particularly in Example 2, the object side surface of the second lens L12 is formed in an aspherical surface with a convex surface on the object side in the paraxial region and without any inflection point on the surface from the center to the effective diameter.

In the mean time, the second lens group G2 is formed of four lenses in which a first lens L21 having a positive refractive power, a second lens L22 having a positive refractive power, a third lens L23 having a negative refractive power, and a fourth lens L24 having a positive refractive power are disposed in order from the object side. Here, for example, the first lens L21 may have an aspherical shape on both the object side surface and the image side surface, the second lens L22 may have a biconvex shape, the third lens L23 may have a negative meniscus shape, and the fourth lens L24 may have a biconvex shape, as in the example shown in FIG. 1.

As described above, in the present zoom lens, the first lens group G1 is formed of four lenses in which the first lens L11 having a negative refractive power, the second lens L12, the third lens L13 having a negative refractive power, and the fourth lens L14 having a positive refractive power are disposed in order from the object side. This may prevent increase in aberrations accompanied by increase in the angle of view while preventing cost increase. Further, in Examples other than Example 4, distortion aberration may be corrected satisfactorily by the use of a lens having a positive refractive power as the second lens L12.

As the second lens L12 of the first lens group G1 has an aspherical surface on the object side surface, distortion aberration may be corrected satisfactorily, and the cost of the zoom lens may be kept low in comparison with the case in which the first lens L11 is formed in an aspherical surface. That is, the positions where the axial light beam and off-axial light beam pass through are generally separated largely before and after the first lens L11, and the first lens L11 or the second lens L12 is preferably an aspherical lens in order to satisfactorily correct distortion aberration. As the first lens L11 generally has a relatively large diameter, if the second lens L12 having relatively a small diameter is formed in an aspherical surface, the cost of the aspherical lens is reduced and eventually the cost of the zoom lens may be kept low.

In Examples other than Example 2, the object side surface of the second lens L12 is formed in an aspherical surface with a concave surface on the object side, in particular, in the paraxial region, so that spherical aberration and distortion aberration may be corrected satisfactorily.

Further, in Examples other than Example 2, at least either one of the object side surface and the image side surface of the second lens L12 is formed in an aspherical surface having at least one inflection point on the surface from the center to the effective diameter, so that distortion aberration and field curvature at the wide angle end may be corrected satisfactorily.

In the mean time, the formation of second lens group G2 with four lenses may inhibit variation in aberration due to zooming while preventing cost increase.

In the present zoom lens, the second lens group G2 is formed of four lenses in which the first lens L21 having a positive refractive power, the second lens L22 having a positive refractive power, the third lens L23 having a negative refractive power, and the fourth lens having a positive power are disposed in order from the object side. This may inhibit variation in aberration due to zooming. That is, if the first lens L21 and the second lens L22 of the second lens group G2 are positive lenses, the axial light beam outputted from the first lens group G1 and diffused largely may be converged by the two positive lenses L21 and L22 in a shared manner, so that the high order spherical aberration may be kept small and variation in aberration due to zooming may be inhibited.

Here, after the first lens group G1 is formed of the first lens L11 having a negative refractive power, the second lens L12, the third lens L13 having a negative refractive power, and the fourth lens L14 having a positive refractive power disposed in order from the object side as described above, when the focal length of the second lens L12 which is the second lens from the object side in the first lens group G1 is taken as $f_{G12}$, the focal length of the entire system at the wide angle end is taken as fw, the focal length of the first lens group G1 is taken as $f_1$, and the focal length of the second lens group G2 is taken as $f_2$, the present zoom lens satisfies both of the aforementioned conditional expressions:

$$0.00 < fw/f_2 < 0.50 \quad (1\text{-}1); \text{ and}$$

$$-0.19 < f_1/f_{G12} < 0.16 \quad (2\text{-}1).$$

Numerical value examples of each condition defined by each of the foregoing conditional expressions are summarized in Table 19 with respect to each Example. The values of $fw/f_2$ defined by the conditional expression (1-1) are indicated in the row of "Conditional Expression (1)" and the values of $f_1/f_{G12}$ defined by the conditional expression (2-1) are indicated in the row of "Conditional Expression (2). Further, the Table 19 also indicates numerical value examples of each condition defined by conditional expressions (3) to (9), to be described later.

The operation and advantageous effects of the configurations defined by the conditional expressions (1-1) and (2-1) will now be described.

The conditional expression (1-1) defines the relationship between the focal length of the entire system at the wide angle end and the focal length of the second lens group G2. If the zoom lens exceeds the upper limit value of the conditional expression (1-1), the refractive power of the second lens group becomes too strong and satisfactory correction of aberrations over the entire zoom range becomes difficult, which is undesirable. As the present zoom lens satisfies the conditional expression (1-1), the foregoing disadvantages are prevented and aberrations may be corrected satisfactorily over the entire zoom range.

As the present zoom lens satisfies, in particular, the conditional expression:

$$0.2 < fw/f_2 < 0.43 \quad (1\text{-}2)$$

within the range defined by the conditional expression (1-1), the foregoing advantageous effects become more significant and as the present zoom lens further satisfies the conditional expression:

$$0.31 < fw/f_2 < 0.35 \quad (1\text{-}3),$$

the foregoing advantageous effects become still more significant.

If the zoom lens falls below the lower limit value of the conditional expression (1-2) or the conditional expression (1-3), the refractive power of the second lens group G2 becomes weak and the amount of movement of the second lens group G2 is increased at the time of zooming, thereby resulting in an extended overall length of the entire optical system and downsizing becomes difficult, which is undesirable. As the present zoom lens satisfies the conditional expressions (1-2) and (1-3), the foregoing disadvantages are prevented and downsizing of the entire optical system may be achieved.

In the mean time, the conditional expression (2-1) defines the relationship between the focal length of the first lens group G1 and the focal length of the second lens L12 in the first lens group G1. If the zoom lens falls below the lower limit value of the conditional expression (2-1), the positive refractive power of the second lens L12 becomes strong and the refractive power of a lens having a negative refractive power, i.e., the first lens L11 or the third lens L13, in the first lens group G1 becomes too strong in order to compensate for this, whereby the correction of aberrations becomes difficult, which is undesirable. Contrary to this, if the zoom lens exceeds the upper limit value of the conditional expression (2-1), the negative refractive power of the second lens L12 becomes too strong and the correction of distortion aberration becomes difficult, which is undesirable. As the present zoom lens satisfies the conditional expression (2-1), the foregoing disadvantages are prevented and distortion aberration and other aberrations may be corrected satisfactorily.

As the present zoom lens satisfies, in particular, the conditional expression described above:

$$-0.15 < f_1/f_{G12} < 0.10 \tag{2-2}$$

within the range defined by the conditional expression (2-1), the foregoing advantageous effects become more significant.

Further, after the first lens group G1 is formed of the first lens L11 having a negative refractive power, the second lens L12, the third lens L13 having a negative refractive power, and the fourth lens L14 having a positive refractive power disposed in order from the object side, and the second lens group G2 is formed of four lenses, as described above, the present zoom lens satisfies both of the aforementioned conditional expressions:

$$0.00 < fw/f_2 < 0.43 \tag{1-4); and}$$

$$-1.00 < f_1/f_{G12} < 0.16 \tag{2-3}.$$

The conditional expression (1-4) defines the relationship between the focal length of the entire system at the wide angle end and the focal length of the second lens group G2, as in the conditional expression (1-1). If the second zoom lens exceeds the upper limit of the conditional expression (1-4), the refractive power of the second lens group G2 becomes too strong and satisfactory correction of aberrations over the entire zoom range becomes difficult, which is undesirable. As the present zoom lens satisfies the conditional expression (1-4), the foregoing disadvantages are prevented and aberrations may be corrected satisfactorily over the entire zoom range.

As the present zoom lens satisfies, in particular, the conditional expression (1-2) described above within the range defined by the conditional expression (1-4), the foregoing advantageous effects become more significant, and as the present zoom lens further satisfies the conditional expression (1-3) described above, the foregoing advantageous effects become still more significant.

If the zoom lens falls below the lower limit value of the conditional expression (1-2) or the conditional expression (1-3), the refractive power of the second lens group G2 becomes weak and the amount of movement of the second lens group G2 is increased at the time of zooming, thereby resulting in an extended overall length of the entire optical system and downsizing becomes difficult, which is undesirable. As the present zoom lens satisfies the conditional expressions (1-2) and (1-3), the foregoing disadvantages are prevented and downsizing of the entire optical system may be achieved.

In the mean time, the conditional expression (2-3) defines the relationship between the focal length of the first lens group G1 and the focal length of the second lens L12 in the first lens group G1, as in the conditional expression (2-1). If the zoom lens falls below the lower limit value of the conditional expression (2-3), the positive refractive power of the second lens L12 becomes strong and the refractive power of a lens having a negative refractive power, i.e., the first lens L11 or the third lens L13, in the first lens group G1 becomes too strong in order to compensate for this, whereby the correction of aberrations becomes difficult, which is undesirable. Contrary to this, if the zoom lens exceeds the upper limit value of the conditional expression (2-3), the negative refractive power of the second lens L12 becomes too strong and the correction of distortion aberration becomes difficult, which is undesirable. As the present zoom lens satisfies the conditional expression (2-3), the foregoing disadvantages are prevented and distortion aberration and other aberrations may be corrected satisfactorily.

As the present zoom lens satisfies, in particular, the conditional expression described above:

$$-0.50 < f_1/f_{G12} < 0.10 \tag{2-4}$$

within the range defined by the conditional expression (2-3), the foregoing advantageous effects become more significant and as the present zoom lens further satisfies the conditional expression (2-2), the foregoing advantageous effects become still more significant.

After the first lens group G1 is formed of the first lens L11 having a negative refractive power, the second lens L12, the third lens L13 having a negative refractive power, and the fourth lens L14 having a positive refractive power disposed in order from the object side, and the second lens group G2 is formed of four lenses, as described above, the present zoom lens satisfies both of the aforementioned conditional expressions:

$$0.27 < fw/f_2 < 0.43 \tag{1-5); and}$$

$$-1.00 < f_1/f_{G12} < 0.29 \tag{2-5}.$$

The conditional expression (1-5) defines the relationship between the focal length of the entire system at the wide angle end and the focal length of the second lens group G2, as in the conditional expression (1-1). If the first zoom lens falls below the lower limit value of the conditional expression (1-5), the refractive power of the second lens group G2 becomes weak and the amount of movement of the second lens group G2 is increased at the time of zooming, thereby resulting in an extended overall length of the entire optical system and downsizing becomes difficult, which is undesirable. Contrary to this, if the zoom lens exceeds the upper limit value of the conditional expression (1-5), the refractive power of the second lens group G2 becomes too strong and satisfactory correction of aberrations over the entire zoom range becomes difficult, which is undesirable. As the present zoom lens satisfies the conditional expression (1-5), the foregoing disadvantages are prevented and downsizing of the entire optical system may be achieved, as well as satisfactory correction of aberrations over the entire zoom range.

As the present zoom lens satisfies, in particular, the conditional expression (1-3) described above within the range defined by the conditional expression (1-5), the foregoing advantageous effects become more significant.

In the mean time, the conditional expression (2-5) defines the relationship between the focal length of the first lens group G1 and the focal length of the second lens L12 in the first lens group G1, as in the conditional expression (2-1). If the zoom lens falls below the lower limit value of the conditional expression (2-5), the positive refractive power of the second lens L12 becomes strong and the refractive power of a lens having a negative refractive power, i.e., the first lens L11 or the third lens L13, in the first lens group G1 becomes too strong in order to compensate for this, whereby the correction of aberrations becomes difficult, which is undesirable. Contrary to this, if the zoom lens exceeds the upper limit value of the conditional expression (2-5), the negative refractive power of the second lens L12 becomes too strong and the correction of distortion aberration becomes difficult, which is undesirable. As the present zoom lens satisfies the conditional expression (2-5), the foregoing disadvantages are prevented and distortion aberration and other aberrations may be corrected satisfactorily.

As the present zoom lens satisfies, in particular, the conditional expression described above:

$$-0.50 < f_1/f_{G12} < 0.29 \tag{2-6}$$

within the range defined by the conditional expression (2-5), the foregoing advantageous effects become more significant and as the present zoom lens further satisfies the conditional expression (2-2) described above, the foregoing advantageous effects become still more significant.

When the focal length of the second lens L12 which is the second lens from the object side in the first lens group G1 is taken as $f_{G12}$ and the focal length of the entire system at the wide angle end is taken as fw, the present zoom lens satisfies a conditional expression given below, so that the following advantageous effects may also be obtained:

$$-0.11 < fw/f_{G12} < 0.12 \tag{3}$$

That is, the conditional expression (3) defines the relationship between the focal length of the entire system at the wide angle end and the focal length of the second lens L12 in the first lens group. If the zoom lens falls below the lower limit value of the conditional expression (3), the refractive power of the second lens L12 will shift to the negative side and the balance in refraction between the center light beam and the peripheral light beam is disrupted, whereby the correction of distortion aberration becomes difficult, which is undesirable. Contrary to this, if the zoom lens exceeds the upper limit value of the conditional expression (3), the positive refractive power of the second lens L12 becomes too strong and the negative refractive power of the entire first lens group G1 becomes insufficient and it becomes difficult to increase the angle of view. It may be conceivable to increase the refractive power of a negative lens in the first lens group G1, i.e., the first lens L11 or the third lens L13 in order to compensate for the insufficiency in the negative refractive power of the entire first lens group G1, but such compensation causes the correction of aberrations to be difficult, which is undesirable. In the case where the zoom lens satisfies the conditional expression (3), the foregoing disadvantages are prevented, whereby distortion aberration is corrected satisfactorily and the angle of view may be increased easily.

In the case where the zoom lens satisfies, in particular, a conditional expression given below within the range defined by the conditional expression (3), the foregoing advantageous effects become more significant:

$$-0.01 < fw/f_{G12} < 0.06 \tag{3'}$$

Further, when the focal length of the first lens group G1 is taken as $f_1$ and the focal length of the second lens group G2 is taken as $f_2$, the present zoom lens satisfies a conditional expression given below, so that the following advantageous effects may also be obtained:

$$0.56 < |f_1/f_2| < 1.04 \tag{4}$$

That is, the conditional expression (4) defines the relationship between the focal length $f_1$ of the first lens group G1 and the focal length $f_2$ of the second lens group G2. If the zoom lens falls below the lower limit value of the conditional expression (4), the refractive power of the second lens group G2 becomes weak and the amount of movement of the second lens group G2 is increased at the time of zooming, thereby resulting in an extended overall length of the entire optical system and downsizing becomes difficult, which is undesirable. Contrary to this, if the zoom lens exceeds the upper limit value of the conditional expression (4), the refractive power of the first lens group G1 becomes insufficient and the diameter of the first lens L11 located on the most object side needs to be increased in order to secure the angle of view, whereby downsizing becomes difficult, which is undesirable. In the case where the zoom lens satisfies the conditional expression (4), the foregoing disadvantages are prevented and the entire optical system may be downsized easily.

In the case where the zoom lens satisfies, in particular, a conditional expression given below within the range defined by the conditional expression (4), the foregoing advantageous effects become more significant:

$$0.70 < |f_1/f_2| < 0.80 \tag{4'}$$

Still further, when the focal length of the entire system at the wide angle end is taken as fw and the focal length of the first lens group G1 is taken as $f_1$, the present zoom lens satisfies a conditional expression given below, so that the following advantageous effects may also be obtained:

$$0.00 < |fw/f_1| < 0.63 \tag{5}$$

That is, the conditional expression (5) defines the relationship between the focal length fw of the entire system at the wide angle end and the focal length $f_1$ of the first lens group G1. If the zoom lens exceeds the upper limit value of the conditional expression (5), the negative refractive power of the first lens group G1 becomes too strong and the correction of off-axis aberrations becomes difficult, which is undesirable. In the case where the zoom lens satisfies the conditional expression (5), the foregoing disadvantages are prevented and off-axis aberrations may be corrected easily.

In the case where the zoom lens satisfies, in particular, a conditional expression given below within the range defined by the conditional expression (5), the foregoing advantageous effects becomes more significant:

$$0.20 < |fw/f_1| < 0.50 \tag{5'}$$

If the zoom lens falls below the lower limit value of the conditional expression (5'), the negative refractive power of the first lens group G1 becomes weak and the size of the entire optical system is increased, which is undesirable. In the case where the zoom lens satisfies the conditional expression (5'), the foregoing disadvantages are prevented and downsizing of the entire optical system may be achieved.

Further, when the maximum effective radius of the object side surface of the second lens from the object side in the first lens group G1 is taken as $H_{G12F}$, the radius of curvature of a spherical surface passing through the center of the object side surface of the second lens and a point on the object side surface at a height of $H_{G12F}$ from the optical axis with the center of the object side surface as the apex of the spherical surface is taken as $r'_{G12F}$, and the radius of curvature of a spherical surface passing through the center of the object side surface of the second lens and a point on the object side surface at a height of $H_{G12F} \times 0.5$ from the optical axis with the center of the object side surface as the apex of the spherical surface is taken as $r''_{G12F}$, the present zoom lens satisfies a conditional expression given below, so that the following advantageous effects may also be obtained:

$$0.20 < H_{G12F} \times \{(1/r'_{G12F}) - (1/r''_{G12F})\} \quad (6).$$

That is, the conditional expression (6) defines, with respect to the object side surface of the second lens L12 in the first lens group G1, the relationship between the maximum effective radius and the aspherical shape. By giving a difference in the radius of curvature between the vicinity of the center of the object side surface of the second lens L12 and the periphery within the range defined by the conditional expression (6), distortion aberration at the wide angle end may be corrected satisfactorily. If the zoom lens falls below the lower limit value of the conditional expression (6), the distortion aberration is under-corrected while if it exceeds the upper limit value, the distortion aberration is over-corrected, either of which is undesirable.

In the case where the zoom lens satisfies, in particular, a conditional expression given below within the range defined by the conditional expression (6), the foregoing advantageous effects become more significant:

$$0.20 < H_{G12F} \times \{(1/r'_{G12F}) - (1/r''_{G12F})\} < 0.50 \quad (6').$$

Still further, when the paraxial radius of curvature of the object side surface of the second lens from the object side in the first lens group G1 is taken as $r_{G12F}$ and the paraxial radius of curvature of the image side surface of the second lens from the object side in the first lens group G1 is taken as $r_{G12R}$, the present zoom lens satisfies a conditional expression given below, so that the following advantageous effects may also be obtained:

$$2.0 < (r_{G12F} + r_{G12R})/(r_{G12F} - r_{G12R}) < 30.0 \quad (7).$$

That is, the conditional expression (7) defines the shape of the second lens L12 of the first lens group G1. If the zoom lens falls below the lower limit value of the conditional expression (7), distortion aberration is under corrected on the wide angle end side, which is undesirable. Contrary to this, if the zoom lens exceeds the upper limit value, satisfactory correction of spherical aberration becomes difficult on the telephoto end side, which is undesirable. In the case where the zoom lens satisfies the conditional expression (7), the foregoing disadvantages are prevented and distortion aberration on the wide angle end side and spherical aberration on the telephoto end side may be corrected satisfactorily.

In the case where the zoom lens satisfies, in particular, a conditional expression given below within the range defined by the conditional expression (7), the foregoing advantageous effects becomes more significant:

$$2.0 < (r_{G12F} + r_{G12R})/(r_{G12F} - r_{G12R}) < 15.0 \quad (7').$$

Further, when the paraxial radius of curvature of the object side surface of the first lens from the object side in the first lens group G1 is taken as $r_{G11F}$ and the paraxial radius of curvature of the image side surface of the first lens from the object side in the first lens group G1 is taken as $r_{G11R}$, the present zoom lens satisfies a conditional expression given below, so that the following advantageous effects may also be obtained:

$$2.5 < (r_{G11F} + r_{G11R})/(r_{G11F} - r_{G11R}) < 10.0 \quad (8).$$

That is, the conditional expression (8) defines the shape of the first lens L11 in the first lens group G1. If the zoom lens falls below the lower limit value of the conditional expression (8), field curvature is under corrected on the wide angle end side, which is undesirable. Contrary to this, if the zoom lens exceeds the upper limit value, field curvature is over corrected on the wide angle end side, which is undesirable. In the case where the zoom lens satisfies the conditional expression (8), the foregoing disadvantages are prevented and field curvature on the wide angle end side may be corrected appropriately.

In the case where the zoom lens satisfies, in particular, a conditional expression given below within the range defined by the conditional expression (8), the foregoing advantageous effects become more significant:

$$2.8 < (r_{G11F} + r_{G11R})/(r_{G11F} - r_{G11R}) < 4.0 \quad (8').$$

Still further, when the focal length of the first lens from the object side in the second lens group is taken as $f_{G21}$ and the focal length of the second lens from the object side in the second lens group G2 is taken as $f_{G22}$, the present zoom lens satisfies a conditional expression given below, so that the following advantageous effects may also be obtained:

$$1.3 < f_{G21}/f_{G22} < 3.0 \quad (9).$$

That is, the conditional expression (9) defines, with respect to the first lens L21 and the second lens L22 in the second lens group G2, the relationship between their focal lengths. If the zoom lens falls below the lower limit value of the conditional expression (9), spherical aberration is under corrected, which is undesirable. Contrary to this, if the zoom lens exceeds the upper limit value, spherical aberration is over corrected, which is undesirable. In the case where the zoom lens satisfies the conditional expression (9), the foregoing disadvantages are prevented and spherical aberration may be corrected satisfactorily over the entire zoom range.

In the case where the zoom lens satisfies, in particular, a conditional expression given below within the range defined by the conditional expression (9), the foregoing advantageous effects becomes more significant:

$$2.0 < f_{G21}/f_{G22} < 2.5 \quad (9').$$

FIG. 1 illustrates an example case in which an optical member PP is disposed between the lens system and image forming surface but, instead of disposing various types of filters, such as a low-pass filter, a filter that will cut a particular wavelength range, and the like as the optical member PP, the filters may be disposed between each lens or a coating having an identical effect to that of the filter may be provided on a lens surface of any of the lenses.

Numerical examples of the zoom lens of the present invention will now be described. The lens cross-sectional views of zoom lenses of Examples 1 to 6 are shown in FIGS. 1 to 6 respectively.

Further, basic lens data, zoom data, and aspherical surface data of the zoom lens of Example 1 are shown in Tables 1, 2, and 3 respectively. Likewise, basic lens data, zoom data, and aspherical surface data of zoom lenses of Examples 2 to 6 are shown in Tables 4 to 18. Meanings of the symbols in the tables will be described herein below, by taking those of Example 1 as example, but the same applies basically to Examples 2 to 6.

In the basic lens data shown in Table 1, the Si column indicates $i^{th}$ surface number in which a number i (i=1, 2, 3, - - - ) is given to each surface in a serially increasing manner toward the image side with the object side surface of the most object side component being taken as the first surface. The Ri column indicates the radius of curvature of $i^{th}$ surface and the Di column indicates the surface distance between $i^{th}$ surface and $(i+1)^{th}$ surface on the optical axis Z. Note that the sign of the radius of curvature is positive if the surface shape is convex on the object side and negative if it is convex on the image side.

Further, in the basic lens data, the Ndj column indicates the refractive index of $j^{th}$ component with respect to the d-line (587.6 nm) in which a number j (j=1, 2, 3, - - - ) is given to each component in a serially increasing manner toward the image side with the most object side lens being taken as the first component, and the vdj column indicates the Abbe number of $j^{th}$ component with respect to the d-line. Note that the basic lens data shown include an aperture stop St and "∞ (Aperture)" is indicated in the column of radius of curvature of the surface corresponding to the aperture stop St.

The symbols D8, D9, and D17 in the basic lens data are surface distances that will vary at the time of zooming, in which D8 represents the distance between the first lens group G1 and the aperture stop St, D9 represents the distance between the aperture stop St and second lens group G2, and D17 represents the distance between the second lens group G2 and the optical member PP.

The zoom data shown in Table 2 indicate focal length (f) of the entire system, F-number (Fno.), total angle of view (2ω), and value of each surface distance that will vary at the time of zooming at each of the wide angle end and the telephoto end.

In the lens data shown in Table 1, an asterisk mark * is attached to the surface number of an aspherical surface and a value of paraxial radius of curvature is shown as the radius of curvature of the aspherical surface. The aspherical surface data shown in Table 3 indicate surface numbers of aspherical surfaces and aspherical surface coefficients of each aspherical surface. The value "E-n" (n: integer) represents "×10$^{-n}$". The aspherical surface coefficients represent values of coefficients KA and RAm (m=3, 4, 5, - - - 16) in an aspherical surface expression given below:

$$Zd = C \cdot h^2 / \{1+(1-KA \cdot C^2 \cdot h^2)^{1/2}\} + \Sigma RAm \cdot h^m,$$

where

Zd: depth of aspheric surface (length of vertical line from a point on the aspheric surface at height h to a flat surface orthogonal to the optical axis to which the aspherical apex contacts);

h: height (distance from the optical axis to lens surface);

C: inverse of paraxial radius of curvature; and

KA, RAm: aspherical surface coefficients (m=3, 4, 5, - - - 16). Values rounded to a predetermined digit are shown in the following tables. Further, in the data of the table shown below, degree is used as the unit of angle and mm is used as the unit of length, but other appropriate units may also be used, as optical systems are usable even when they are proportionally increased or decreased.

TABLE 1

Example 1 • Basic Lens Data

| Si (Surface Number) | Ri (Radius of Curvature) | Di (Surface Distance) | Ndj (Refractive Index) | vdj (Abbe Number) |
|---|---|---|---|---|
| 1 | 16.7910 | 0.80 | 1.78590 | 44.2 |
| 2 | 8.7843 | 3.04 | | |
| *3 | −22.1777 | 2.10 | 1.53389 | 56.0 |
| *4 | −18.3950 | 0.67 | | |
| 5 | 158.3861 | 0.70 | 1.78590 | 44.2 |
| 6 | 5.9611 | 2.50 | | |
| 7 | 8.1910 | 1.53 | 1.92286 | 18.9 |
| 8 | 11.8859 | D8 | | |
| 9 | ∞ (Aperture) | D9 | | |
| *10 | 11.4416 | 1.50 | 1.53389 | 56.0 |
| *11 | 58.5954 | 0.10 | | |
| 12 | 9.4968 | 4.15 | 1.49700 | 81.5 |
| 13 | −11.2458 | 0.90 | | |
| 14 | 14.6399 | 0.70 | 1.92286 | 20.9 |
| 15 | 6.0474 | 1.02 | | |
| 16 | 17.2969 | 2.25 | 1.51742 | 52.4 |
| 17 | −15.0096 | D17 | | |

TABLE 1-continued

Example 1 • Basic Lens Data

| Si (Surface Number) | Ri (Radius of Curvature) | Di (Surface Distance) | Ndj (Refractive Index) | vdj (Abbe Number) |
|---|---|---|---|---|
| 18 | ∞ | 1.01 | 1.51633 | 64.1 |
| 19 | ∞ | 6.84 | | |

*Aspherical Surface

TABLE 2

Example 1 • Zoom Data

| Specs | Wide Angle End | Telephoto End |
|---|---|---|
| f | 3.18 | 7.95 |
| Fno. | 1.85 | 3.10 |
| 2ω | 93.39 | 43.28 |
| D8 | 12.10 | 3.55 |
| D9 | 7.13 | 0.96 |
| D17 | 0.00 | 6.17 |

TABLE 3

Example 1 • Aspherical Surface Data

| Surface Number | S3 | S4 |
|---|---|---|
| KA | 1.00000000E+00 | 1.00000000E+00 |
| RA3 | 3.92552657E−04 | −1.78198417E−03 |
| RA4 | 1.63491671E−03 | 2.96047622E−03 |
| RA5 | −5.98243470E−05 | −3.54470466E−04 |
| RA6 | −3.12580573E−05 | −2.14656523E−05 |
| RA7 | 3.08631891E−06 | 3.49680699E−06 |
| RA8 | 2.06084921E−07 | 5.77269401E−07 |
| RA9 | −3.30656971E−08 | 1.80867183E−08 |
| RA10 | 7.50984913E−10 | −1.28540306E−08 |
| RA11 | 4.80884982E−10 | −1.51109077E−09 |
| RA12 | −6.15184533E−11 | 2.22386867E−10 |

| Surface Number | S10 | S11 |
|---|---|---|
| KA | 1.00000000E+00 | 1.00000000E+00 |
| RA3 | 1.88211972E−03 | 1.76860217E−03 |
| RA4 | −1.21236781E−03 | −2.69165382E−04 |
| RA5 | 6.04426291E−04 | 3.95866507E−04 |
| RA6 | −8.55374397E−05 | −2.23064469E−05 |
| RA7 | −4.99070718E−06 | −9.52288260E−06 |
| RA8 | 6.90562953E−07 | 1.17774794E−06 |
| RA9 | 1.79754879E−07 | −6.42044665E−08 |
| RA10 | 4.73691904E−09 | 6.39130198E−09 |
| RA11 | −4.62119417E−10 | 3.66073819E−09 |
| RA12 | −2.98496187E−10 | 5.76274981E−11 |
| RA13 | 3.48467387E−11 | −1.74712784E−10 |
| RA14 | −1.45151464E−11 | 3.01771364E−11 |
| RA15 | −3.10163706E−12 | −4.20522148E−13 |
| RA16 | 3.84723135E−13 | −7.01830246E−13 |

TABLE 4

Example 2 • Basic Lens Data

| Si (Surface Number) | Ri (Radius of Curvature) | Di (Surface Distance) | Ndj (Refractive Index) | vdj (Abbe Number) |
|---|---|---|---|---|
| 1 | 12.0000 | 0.85 | 1.83481 | 42.7 |
| 2 | 7.7547 | 3.00 | | |
| *3 | 333.8853 | 2.40 | 1.53389 | 56.0 |
| *4 | −188.2116 | 2.26 | | |
| 5 | −111.2925 | 0.70 | 1.88300 | 40.8 |
| 6 | 5.9612 | 1.45 | | |

TABLE 4-continued

Example 2 • Basic Lens Data

| Si (Surface Number) | Ri (Radius of Curvature) | Di (Surface Distance) | Ndj (Refractive Index) | vdj (Abbe Number) |
|---|---|---|---|---|
| 7 | 7.9606 | 1.85 | 1.92286 | 18.9 |
| 8 | 15.3951 | D8 | | |
| 9 | ∞ (Aperture) | D9 | | |
| *10 | 14.8790 | 2.00 | 1.53389 | 56.0 |
| *11 | −27.1649 | 0.47 | | |
| 12 | 11.7962 | 4.30 | 1.61800 | 63.3 |
| 13 | −9.3009 | 0.10 | | |
| 14 | −72.9131 | 0.70 | 1.84566 | 23.8 |
| 15 | 7.0342 | 0.75 | | |
| 16 | 18.7928 | 2.20 | 1.58144 | 40.8 |
| 17 | −14.1574 | D17 | | |
| 18 | ∞ | 1.01 | 1.51633 | 64.1 |
| 19 | ∞ | 6.82 | | |

*Aspherical Surface

TABLE 5

Example 2 • Zoom Data

| Specs | Wide Angle End | Telephoto End |
|---|---|---|
| f | 3.36 | 8.39 |
| Fno. | 1.82 | 3.18 |
| 2ω | 90.62 | 41.16 |
| D8 | 8.77 | 2.45 |
| D9 | 8.58 | 1.94 |
| D17 | 1.00 | 7.64 |

TABLE 6

Example 2 • Aspherical Surface Data

| Surface Number | S3 | S4 |
|---|---|---|
| KA | 1.00000000E+00 | 1.00000000E+00 |
| RA3 | −1.84518151E−04 | −1.34452536E−03 |
| RA4 | 9.11020231E−04 | 1.50433453E−03 |
| RA5 | 4.36869407E−05 | −1.88326554E−05 |
| RA6 | −9.99470488E−06 | −1.02662481E−05 |
| RA7 | −4.77789164E−07 | −1.12222737E−06 |
| RA8 | 3.77729589E−08 | −8.06437604E−08 |
| RA9 | 7.69951469E−09 | 1.03269414E−09 |
| RA10 | 1.57751409E−09 | 1.07327708E−09 |
| RA11 | −1.53152663E−10 | 1.29361362E−10 |
| RA12 | −1.25879264E−11 | 3.43709353E−12 |

| Surface Number | S10 | S11 |
|---|---|---|
| KA | 1.86689145E+00 | −2.34761165E+00 |
| RA3 | 6.38886087E−04 | 8.63959607E−04 |
| RA4 | −1.72624605E−04 | 4.82943361E−04 |
| RA5 | 1.56425637E−04 | 1.17579182E−04 |
| RA6 | −1.72640984E−05 | 1.95121845E−05 |
| RA7 | −1.15229550E−06 | −7.32560718E−06 |
| RA8 | 4.72324927E−08 | 1.36453243E−06 |
| RA9 | 6.56977631E−08 | −6.02693745E−08 |
| RA10 | −6.88442793E−09 | −3.61578440E−10 |
| RA11 | −2.38022413E−10 | −1.02638686E−10 |
| RA12 | −3.22383884E−11 | −6.75284248E−12 |
| RA13 | 1.02907272E−12 | 3.06525203E−12 |
| RA14 | 5.19740494E−13 | 2.84165637E−12 |
| RA15 | −1.83177171E−13 | −4.24793926E−13 |
| RA16 | −1.74412406E−16 | 5.14814396E−14 |

TABLE 7

Example 3 • Basic Lens Data

| Si (Surface Number) | Ri (Radius of Curvature) | Di (Surface Distance) | Ndj (Refractive Index) | vdj (Abbe Number) |
|---|---|---|---|---|
| 1 | 18.0197 | 0.80 | 1.78590 | 44.2 |
| 2 | 8.8085 | 3.13 | | |
| *3 | −29.3048 | 2.54 | 1.53389 | 56.0 |
| *4 | −15.3177 | 0.26 | | |
| 5 | −387.3951 | 0.70 | 178590 | 44.2 |
| 6 | 5.9157 | 2.44 | | |
| 7 | 7.9344 | 1.56 | 1.92286 | 18.9 |
| 8 | 11.3636 | D8 | | |
| 9 | ∞ (Aperture) | D9 | | |
| *10 | 11.4802 | 1.50 | 1.53389 | 56.0 |
| *11 | 59.6824 | 0.10 | | |
| 12 | 9.5074 | 4.20 | 1.49700 | 81.5 |
| 13 | −11.0673 | 0.92 | | |
| 14 | 14.9169 | 0.74 | 1.92286 | 20.9 |
| 15 | 6.0354 | 0.95 | | |
| 16 | 17.4298 | 2.23 | 1.51742 | 52.4 |
| 17 | −14.7168 | D17 | | |
| 18 | ∞ | 1.01 | 1.51633 | 64.1 |
| 19 | ∞ | 6.79 | | |

*Aspherical Surface

TABLE 8

Example 3 • Zoom Data

| Specs | Wide Angle End | Telephoto End |
|---|---|---|
| f | 3.19 | 7.98 |
| Fno. | 1.84 | 3.10 |
| 2ω | 93.23 | 43.22 |
| D8 | 12.05 | 3.55 |
| D9 | 7.10 | 0.95 |
| D17 | 0.00 | 6.16 |

TABLE 9

Example 3 • Aspherical Surface Data

| Surface Number | S3 | S4 |
|---|---|---|
| KA | 1.00000000E+00 | 1.00000000E+00 |
| RA3 | −3.92896399E−04 | −2.13763767E−03 |
| RA4 | 1.59073904E−03 | 2.91750862E−03 |
| RA5 | −5.69315036E−05 | −3.58929668E−04 |
| RA6 | −3.09012532E−05 | −2.16238082E−05 |
| RA7 | 3.08376455E−06 | 3.52532145E−06 |
| RA8 | 2.01913214E−07 | 5.85035760E−07 |
| RA9 | −3.35542117E−08 | 1.83747727E−08 |
| RA10 | 7.17802063E−10 | −1.27915817E−08 |
| RA11 | 4.82375497E−10 | −1.50321640E−09 |
| RA12 | −6.07407734E−11 | 2.23818828E−10 |

| Surface Number | S10 | S11 |
|---|---|---|
| KA | 1.00000000E+00 | 1.00000000E+00 |
| RA3 | 1.76132207E−03 | 1.62917632E−03 |
| RA4 | −1.20250122E−03 | −2.54326990E−04 |
| RA5 | 6.05031687E−04 | 3.97279047E−04 |
| RA6 | −8.55614525E−05 | −2.21530506E−05 |
| RA7 | −4.99565629E−06 | −9.51075191E−06 |
| RA8 | 6.90298187E−07 | 1.17877317E−06 |
| RA9 | 1.79779961E−07 | −6.41427571E−08 |
| RA10 | 4.74445204E−09 | 6.39564855E−09 |
| RA11 | −4.60842095E−10 | 3.66096527E−09 |
| RA12 | −2.98218247E−10 | 5.76689611E−11 |
| RA13 | 3.48935761E−11 | −1.74705742E−10 |
| RA14 | −1.45031348E−11 | 3.01805056E−11 |

TABLE 9-continued

Example 3 • Aspherical Surface Data

| | | |
|---|---|---|
| RA15 | −3.10067265E−12 | −4.18867888E−13 |
| RA16 | 3.84662428E−13 | −7.01204898E−13 |

TABLE 10

Example 4 • Basic Lens Data

| Si (Surface Number) | Ri (Radius of Curvature) | Di (Surface Distance) | Ndj (Refractive Index) | νdj (Abbe Number) |
|---|---|---|---|---|
| 1 | 15.0647 | 0.80 | 1.78590 | 44.2 |
| 2 | 8.7870 | 3.39 | | |
| *3 | −12.0041 | 1.68 | 1.53389 | 56.0 |
| *4 | −13.2378 | 0.72 | | |
| 5 | 79.6843 | 0.70 | 1.83481 | 42.7 |
| 6 | 6.0492 | 2.40 | | |
| 7 | 8.3918 | 1.57 | 1.92286 | 18.9 |
| 8 | 12.8384 | D8 | | |
| 9 | ∞ (Aperture) | D9 | | |
| *10 | 11.5886 | 1.50 | 1.53389 | 56.0 |
| *11 | 62.6674 | 0.10 | | |
| 12 | 9.3886 | 4.14 | 1.49700 | 81.5 |
| 13 | −11.4819 | 0.84 | | |
| 14 | 14.3873 | 0.70 | 1.92286 | 20.9 |
| 15 | 6.0411 | 1.06 | | |
| 16 | 18.2998 | 2.26 | 1.51742 | 52.4 |
| 17 | −14.5710 | D17 | | |
| 18 | ∞ | 1.01 | 1.51633 | 64.1 |
| 19 | ∞ | 6.91 | | |

*Aspherical Surface

TABLE 11

Example 4 • Zoom Data

| Specs | Wide Angle End | Telephoto End |
|---|---|---|
| f | 3.19 | 7.99 |
| Fno. | 1.85 | 3.10 |
| 2ω | 93.11 | 43.14 |
| D8 | 12.11 | 3.55 |
| D9 | 7.15 | 0.96 |
| D17 | 0.00 | 6.19 |

TABLE 12

Example 4 • Aspherical Surface Data

| Surface Number | S3 | S4 |
|---|---|---|
| KA | 1.00000000E+00 | 1.00000000E+00 |
| RA3 | 1.97673389E−03 | −5.14428429E−04 |
| RA4 | 1.87516095E−03 | 3.12292451E−03 |
| RA5 | −8.83901056E−05 | −3.73387017E−04 |
| RA6 | −3.45164616E−05 | −2.15361781E−05 |
| RA7 | 3.39216521E−06 | 3.59181888E−06 |
| RA8 | 2.83245128E−07 | 6.11999137E−07 |
| RA9 | −3.25234250E−08 | 2.16820702E−08 |
| RA10 | −1.62438093E−10 | −1.26000740E−08 |
| RA11 | 4.02161038E−10 | −1.56205805E−09 |
| RA12 | −4.93251419E−11 | 2.07287653E−10 |

| Surface Number | S10 | S11 |
|---|---|---|
| KA | 1.00000000E+00 | 1.00000000E+00 |
| RA3 | 1.94128295E−03 | 1.86623411E−03 |
| RA4 | −1.23941301E−03 | −3.36191383E−04 |
| RA5 | 6.08149148E−04 | 4.06331604E−04 |
| RA6 | −8.51668505E−05 | −2.18876430E−05 |
| RA7 | −4.93462600E−06 | −9.60813947E−06 |

TABLE 12-continued

Example 4 • Aspherical Surface Data

| | | |
|---|---|---|
| RA8 | 6.94019051E−07 | 1.17663239E−06 |
| RA9 | 1.80217543E−07 | −6.42807894E−08 |
| RA10 | 4.56975362E−09 | 6.62207183E−09 |
| RA11 | −4.56633408E−10 | 3.67837311E−09 |
| RA12 | −2.91798675E−10 | 6.28058891E−11 |
| RA13 | 3.76317402E−11 | −1.70699217E−10 |
| RA14 | −1.38781021E−11 | 3.16879777E−11 |
| RA15 | −2.99033991E−12 | 2.08736136E−13 |
| RA16 | 3.59472958E−13 | −8.60992007E−13 |

TABLE 13

Example 5 • Basic Lens Data

| Si (Surface Number) | Ri (Radius of Curvature) | Di (Surface Distance) | Ndj (Refractive Index) | νdj (Abbe Number) |
|---|---|---|---|---|
| 1 | 17.7205 | 0.80 | 1.78590 | 44.2 |
| 2 | 8.7860 | 3.01 | | |
| *3 | −36.6744 | 2.61 | 1.53389 | 56.0 |
| *4 | −19.6099 | 0.39 | | |
| 5 | 421.7536 | 0.70 | 1.78590 | 44.2 |
| 6 | 5.9262 | 2.47 | | |
| 7 | 8.0207 | 1.54 | 1.92286 | 18.9 |
| 8 | 11.4973 | D8 | | |
| 9 | ∞ (Aperture) | D9 | | |
| *10 | 11.3062 | 1.50 | 1.53389 | 56.0 |
| *11 | 55.2334 | 0.10 | | |
| 12 | 9.4789 | 4.16 | 1.49700 | 81.5 |
| 13 | −11.2650 | 0.92 | | |
| 14 | 14.8237 | 0.70 | 1.92286 | 20.9 |
| 15 | 6.0417 | 0.94 | | |
| 16 | 16.2485 | 2.19 | 1.51742 | 52.4 |
| 17 | −15.4996 | D17 | | |
| 18 | ∞ | 1.01 | 1.51633 | 64.1 |
| 19 | ∞ | 6.85 | | |

*Aspherical Surface

TABLE 14

Example 5 • Zoom Data

| Specs | Wide Angle End | Telephoto End |
|---|---|---|
| f | 3.20 | 7.99 |
| Fno. | 1.85 | 3.10 |
| 2ω | 93.25 | 43.15 |
| D8 | 12.04 | 3.55 |
| D9 | 7.09 | 0.95 |
| D17 | 0.00 | 6.14 |

TABLE 15

Example 5 • Aspherical Surface Data

| Surface Number | S3 | S4 |
|---|---|---|
| KA | 1.00000000E+00 | 1.00000000E+00 |
| RA3 | −4.30601440E−04 | −2.45942098E−03 |
| RA4 | 1.43624994E−03 | 2.89828666E−03 |
| RA5 | −3.55884451E−05 | −3.71151955E−04 |
| RA6 | −3.08553414E−05 | −2.14177604E−05 |
| RA7 | 2.83817696E−06 | 3.61955608E−06 |
| RA8 | 1.79586380E−07 | 5.91009605E−07 |
| RA9 | −3.24112553E−08 | 1.81447671E−08 |
| RA10 | 1.20108913E−09 | −1.28743984E−08 |
| RA11 | 5.15204525E−10 | −1.51244540E−09 |
| RA12 | −6.86137874E−11 | 2.22680423E−10 |

TABLE 15-continued

Example 5 • Aspherical Surface Data

| Surface Number | S10 | S11 |
|---|---|---|
| KA | 1.00000000E+00 | 1.00000000E+00 |
| RA3 | 1.76814202E−03 | 1.62203935E−03 |
| RA4 | −1.21678337E−03 | −2.45116314E−04 |
| RA5 | 6.06179040E−04 | 3.88478822E−04 |
| RA6 | −8.58569578E−05 | −2.21235612E−05 |
| RA7 | −4.99796243E−06 | −9.42747893E−06 |
| RA8 | 6.97601547E−07 | 1.19048864E−06 |
| RA9 | 1.81003252E−07 | −6.30576600E−08 |
| RA10 | 4.91247208E−09 | 6.49947884E−09 |
| RA11 | −4.43304548E−10 | 3.66517494E−09 |
| RA12 | −2.94072014E−10 | 5.85100526E−11 |
| RA13 | 3.45122935E−11 | −1.74157715E−10 |
| RA14 | −1.43374070E−11 | 2.94645898E−11 |
| RA15 | −3.18348899E−12 | −4.90574065E−13 |
| RA16 | 3.91257516E−13 | −6.76391292E−13 |

TABLE 16

Example 6 • Basic Lens Data

| Si (Surface Number) | Ri (Radius of Curvature) | Di (Surface Distance) | Ndj (Refractive Index) | vdj (Abbe Number) |
|---|---|---|---|---|
| 1 | 17.9420 | 0.80 | 1.78590 | 44.2 |
| 2 | 8.7868 | 2.94 | | |
| *3 | −70.8941 | 2.93 | 1.53389 | 56.0 |
| *4 | −26.6446 | 0.37 | | |
| 5 | 400.8261 | 0.70 | 1.78590 | 44.2 |
| 6 | 5.8867 | 2.44 | | |
| 7 | 8.1404 | 1.54 | 1.92286 | 18.9 |
| 8 | 11.8520 | D8 | | |
| 9 | ∞ (Aperture) | D9 | | |
| *10 | 11.2098 | 1.50 | 1.53389 | 56.0 |
| *11 | 52.9915 | 0.10 | | |
| 12 | 9.2969 | 4.14 | 1.49700 | 81.5 |
| 13 | −11.5666 | 0.87 | | |
| 14 | 14.2844 | 0.70 | 1.92286 | 20.9 |
| 15 | 5.9671 | 0.95 | | |
| 16 | 15.0986 | 2.25 | 1.51742 | 52.4 |
| 17 | −16.6844 | D17 | | |
| 18 | ∞ | 1.01 | 1.51633 | 64.1 |
| 19 | ∞ | 6.81 | | |

*Aspherical Surface

TABLE 17

Example 6 • Zoom Data

| Specs | Wide Angle End | Telephoto End |
|---|---|---|
| f | 3.18 | 7.95 |
| Fno. | 1.84 | 3.10 |
| 2ω | 93.44 | 43.18 |

TABLE 17-continued

Example 6 • Zoom Data

| Specs | Wide Angle End | Telephoto End |
|---|---|---|
| D8 | 11.88 | 3.55 |
| D9 | 7.11 | 0.96 |
| D17 | 0.00 | 6.15 |

TABLE 18

Example 6 • Aspherical Surface Data

| Surface Number | S3 | S4 |
|---|---|---|
| KA | 1.00000000E+00 | 1.00000000E+00 |
| RA3 | 1.15512555E−03 | −1.94623465E−03 |
| RA4 | 4.63209518E−04 | 2.52796589E−03 |
| RA5 | 1.00473917E−04 | −3.74279507E−04 |
| RA6 | −2.62873609E−05 | −1.43978882E−05 |
| RA7 | 1.35555017E−06 | 4.10668149E−06 |
| RA8 | 5.74392491E−09 | 5.42252724E−07 |
| RA9 | −2.60745641E−08 | 4.15486735E−09 |
| RA10 | 5.11033586E−09 | −1.45090144E−08 |
| RA11 | 8.64355180E−11 | −1.53424052E−09 |
| RA12 | −1.44079980E−10 | 2.60125627E−10 |

| Surface Number | S10 | S11 |
|---|---|---|
| KA | 1.00000000E+00 | 1.00000000E+00 |
| RA3 | 1.92172358E−03 | 1.98334763E−03 |
| RA4 | −1.18082835E−03 | −3.45009857E−04 |
| RA5 | 5.95776768E−04 | 4.03232975E−04 |
| RA6 | −8.55219828E−05 | −2.20337853E−05 |
| RA7 | −4.72078410E−06 | −9.21699036E−06 |
| RA8 | 7.37744871E−07 | 1.20539081E−06 |
| RA9 | 1.82849964E−07 | −6.65042934E−08 |
| RA10 | 5.54926203E−09 | 5.97488617E−09 |
| RA11 | −3.93487769E−10 | 3.82001970E−09 |
| RA12 | −2.92839034E−10 | 9.08656714E−11 |
| RA13 | 3.11584436E−11 | −1.56124185E−10 |
| RA14 | −1.47954864E−11 | 2.62156555E−11 |
| RA15 | −2.87211663E−12 | 1.04054388E−12 |
| RA16 | 3.00829759E−13 | −1.03639592E−12 |

Further, values corresponding to the conditional expressions (1-1) to (1-5), (2-1) to (2-6), and (3) to (9) of Examples 1 to 6 are shown in Table 19. The values shown here are those of the conditions defined by each conditional expression, i.e., each literal expression. For example, values of $fw/f_{G12}$ are shown in the row of "Conditional Expression (3)". As the conditional expressions (1-1) to (1-5) commonly define the condition of $fw/f_2$, the values of $fw/f_2$ are indicated in the row collectively referred to as "Conditional Expression (1)". Also, as the conditional expressions (2-1) to (2-6) commonly define the condition of $f_1/fG_{12}$, the values of $f_1/fG_{12}$ are indicated in the row collectively referred to as "Conditional Expression (2)". Note that the values in Table 19 are those with respect to the d-line.

TABLE 19

| | Example 1 | Example 2 | Example 3 | Example 4 | Example 5 | Example 6 |
|---|---|---|---|---|---|---|
| Conditional Expression (1) | 0.317 | 0.344 | 0.319 | 0.317 | 0.320 | 0.320 |
| Conditional Expression (2) | −0.046 | −0.033 | −0.138 | 0.017 | −0.104 | −0.099 |
| Conditional Expression (3) | 0.019 | 0.015 | 0.056 | −0.007 | 0.043 | 0.041 |
| Conditional Expression (4) | 0.774 | 0.758 | 0.778 | 0.775 | 0.781 | 0.777 |
| Conditional Expression (5) | 0.409 | 0.453 | 0.409 | 0.409 | 0.410 | 0.412 |

TABLE 19-continued

|  | Example 1 | Example 2 | Example 3 | Example 4 | Example 5 | Example 6 |
|---|---|---|---|---|---|---|
| Conditional Expression (6) | 0.373 | 0.345 | 0.324 | 0.445 | 0.284 | 0.234 |
| Conditional Expression (7) | 10.726 | 0.279 | 3.190 | −20.460 | 3.298 | 2.204 |
| Conditional Expression (8) | 3.194 | 4.653 | 2.913 | 3.799 | 2.967 | 2.920 |
| Conditional Expression (9) | 2.374 | 2.006 | 2.386 | 2.369 | 2.372 | 2.369 |

Spherical aberration, astigmatism, distortion (distortion aberration), and lateral chromatic aberration (chromatic aberration of magnification) of Example 1 at the wide angle end are illustrated respectively in diagrams A to D of FIG. 7 while spherical aberration, astigmatism, distortion (distortion aberration), and lateral chromatic aberration (chromatic aberration of magnification) of Example 1 at the telephoto end are illustrated respectively in diagrams E to H of FIG. 7.

Each aberration diagram is with respect to the d-line (wavelength of 587.6 nm), but the spherical aberration diagrams also illustrate aberrations with respect to the g-line (wavelength of 435.8 nm) and C-line (wavelength of 656.3 nm), and the lateral chromatic aberration diagrams illustrate aberrations with respect to the g-line and the C-line. In the astigmatism diagrams, the solid line illustrates astigmatism in the sagittal direction while the dotted line illustrates astigmatism in the tangential direction. The Fno. in the spherical aberration diagrams represents the F-number and ω in the other aberration diagrams represents the half angle of view.

Likewise, aberrations of Example 2 at the wide angle end and at the telephoto end are illustrated respectively in the diagrams A to H of FIG. 8. Likewise, aberration diagrams of Examples 3 to 6 are shown in FIGS. 9 to 12.

Next, an imaging apparatus according to an embodiment of the present invention will be described. As an example of imaging apparatus according to an embodiment of the present invention, a schematic configuration diagram of an imaging apparatus 10 that uses a zoom lens 1 of an embodiment of the present invention is shown in FIG. 13. As for the imaging apparatus, for example, a surveillance camera, a video camera, or an electronic still camera may be cited.

The imaging apparatus 10 illustrated in FIG. 13 includes the zoom lens 1, an image sensor 2 disposed on the image side of the zoom lens 1 and captures an image of a subject formed by the zoom lens 1, a signal processing unit 4 that performs an arithmetic operation on the output signal from the image sensor 2, a zoom control unit 5 for zooming the zoom lens 1, and a focus control unit 6 for performing focus control. Note that a filter or the like may be disposed between the zoom lens 1 and the image sensor 2.

The zoom lens 1 has a first lens group G1 having a negative refractive power and is moved to the image side so as to draw a convex trajectory upon zooming from the wide angle end to the telephoto end, a second lens group G2 having a positive refractive power and is moved monotonically to the object side upon zooming from the wide angle end to the telephoto end, and a fixed aperture stop St. Note that each lens group is schematically illustrated in FIG. 13.

The image sensor 2 outputs an electrical signal by capturing an optical image formed by the zoom lens 1 and is disposed such that the imaging surface thereof corresponds to the image plane. As for the image sensor 2, for example, an image sensor formed of CCD, CMOS, or the like may be used.

Although not shown in FIG. 13, the imaging apparatus 10 may further include a shake correction mechanism that corrects blurring of captured image at the time of vibration or camera shake by moving, for example, a lens having a positive refractive power and constituting a part of the second lens group G2 in a direction perpendicular to the optical axis Z.

As the imaging apparatus 10 includes the zoom lens of the present invention having the advantageous effects described above, the apparatus may realize downsizing, low cost, and increased angle of view, as well as favorable optical performance.

So far, the present invention has been described by way of embodiments and Examples, but the present invention is not limited to the foregoing embodiments and Examples and various modifications may be made. For example, values of the radius of curvature of each lens element, surface distance, refractive index, Abbe number, aspherical surface coefficient, and the like are not limited to those illustrated in each numerical example and may take other values.

What is claimed is:

1. A zoom lens consisting of a first lens group having a negative refractive power and a second lens group having a positive refractive power, disposed in order from the object side, wherein:
    zooming is performed by moving the first lens group and the second lens group;
    the first lens group consists of a first lens having a negative refractive power, a second lens, a third lens having a negative refractive power, and a fourth lens having a positive refractive power;
    the second lens group consists of four lenses; and
    when the focal length of the second lens from the object side in the first lens group is taken as $f_{G12}$, the focal length of the entire system at the wide angle end is taken as fw, the focal length of the first lens group is taken as $f_1$, and the focal length of the second lens group is taken as $f_2$, the zoom lens satisfies conditional expressions given below:

$$0.00 < fw/f_2 < 0.50 \quad (1\text{-}1); \text{ and}$$

$$-0.09 < f_1/f_{G12} < 0.16 \quad (2\text{-}1).$$

2. The zoom lens of claim 1, wherein the zoom lens satisfies at least either one of conditional expressions given below with respect to the focal lengths $f_{G12}$, fw, $f_1$ and $f_2$:

$$0.20 < fw/f_2 < 0.43 \quad (1\text{-}2); \text{ and}$$

$$-0.15 < f_1/f_{G12} < 0.10 \quad (2\text{-}2).$$

3. The zoom lens of claim 1, wherein the zoom lens satisfies a conditional expression given below with respect to the focal lengths fw and $f_2$:

$$0.31 < fw/f_2 < 0.35 \quad (1\text{-}3).$$

4. The zoom lens of claim 1, wherein, when the second lens from the object side in the first lens group is taken as $f_{G12}$ and the focal length of the entire system at the wide angle end is taken as fw, the zoom lens satisfies a conditional expression given below:

$$-0.11 < fw/f < 0.12 \qquad (3).$$

5. The zoom lens of claim 4, wherein the zoom lens satisfies a conditional expression given below:

$$-0.01 < fw/f_{G12} < 0.06 \qquad (3').$$

6. The zoom lens of claim 1, wherein, when the focal length of the first lens group is taken as $f_1$ and the focal length of the second lens group is taken as $f_2$, the zoom lens satisfies a conditional expression given below:

$$0.56 < |f_1/f_2| < 1.04 \qquad (4).$$

7. The zoom lens of claim 6, wherein the zoom lens satisfies a conditional expression given below:

$$0.70 < |f_1/f_2| < 0.80 \qquad (4').$$

8. The zoom lens of claim 1, wherein, when the focal length of the entire system at the wide angle end is taken as fw and the focal length of the first lens group is taken as $f_1$, the zoom lens satisfies a conditional expression given below:

$$0.00 < |fw/f_1| < 0.63 \qquad (5).$$

9. The zoom lens of claim 8, wherein the zoom lens satisfies a conditional expression given below:

$$0.20 < |fw/f_1| < 0.50 \qquad (5').$$

10. The zoom lens of claim 1, wherein, when the maximum effective radius of the object side surface of the second lens from the object side in the first lens group is taken as $H_{G12F}$, the radius of curvature of a spherical surface passing through the center of the object side surface of the second lens and a point on the object side surface at a height of $H_{G12F}$ from the optical axis with the center of the object side surface as the apex of the spherical surface is taken as $r'_{G12F}$, and the radius of curvature of a spherical surface passing through the center of the object side surface of the second lens and a point on the object side surface at a height of $H_{G12F} \times 0.5$ from the optical axis with the center of the object side surface as the apex of the spherical surface is taken as $r''_{G12F}$, the zoom lens satisfies a conditional expression given below:

$$0.20 < H_{G12F} \times \{(1/r'_{G12F}) - (1/r''_{G12F})\} \qquad (6).$$

11. The zoom lens of claim 1, wherein, when the paraxial radius of curvature of the object side surface of the second lens from the object side in the first lens group is taken as $r_{G12F}$ and the paraxial radius of curvature of the image side surface of the second lens from the object side in the first lens group is taken as $r_{G12R}$, the zoom lens satisfies a conditional expression given below:

$$2.0 < (r_{G12F} + r_{G12R})/(r_{G12F} - r_{G12R}) < 30.0 \qquad (7).$$

12. The zoom lens of claim 1, wherein, when the paraxial radius of curvature of the object side surface of the first lens from the object side in the first lens group is taken as $r_{G11F}$ and the paraxial radius of curvature of the image side surface of the first lens from the object side in the first lens group is taken as $r_{G11R}$, the zoom lens satisfies a conditional expression given below:

$$2.5 < (r_{G11F} + r_{G11R})/(r_{G11F} - r_{G11R}) < 10.0 \qquad (8).$$

13. The zoom lens of claim 1, wherein, when the focal length of the first lens from the object side in the second lens group is taken as $f_{G21}$ and the focal length of the second lens from the object side in the second lens group G2 is taken as $f_{G22}$, the zoom lens satisfies a conditional expression given below:

$$1.3 < f_{G21}/f_{G22} < 3.0 \qquad (9).$$

14. An imaging apparatus, comprising the zoom lens of claim 1.

15. A zoom lens consisting of a first lens group having a negative refractive power and a second lens group having a positive refractive power, disposed in order from the object side, wherein:

zooming is performed by moving the first lens group and the second lens group;

the first lens group consists of a first lens having a negative refractive power, a second lens, a third lens having a negative refractive power, and a fourth lens having a positive refractive power;

the second lens group consists of four lenses; and when the focal length of the second lens from the object side in the first lens group is taken as $f_{G12}$, the focal length of the entire system at the wide angle end is taken as fw, the focal length of the first lens group is taken as $f_1$, and the focal length of the second lens group is taken as $f_2$, the zoom lens satisfies conditional expressions given below:

$$0.00 < fw/f_2 < 0.43 \qquad (1\text{-}4); \text{ and}$$

$$-1.00 < f_1/f_{G12} < 0.16 \qquad (2\text{-}3).$$

16. The zoom lens of claim 15, wherein the zoom lens satisfies at least either one of conditional expressions given below with respect to $f_{G12}$, fw, $f_1$, and $f_2$:

$$0.20 < fw/f_2 < 0.43 \qquad (1\text{-}2); \text{ and}$$

$$-0.50 < f_1/f_{G12} < 0.10 \qquad (2\text{-}4).$$

17. The zoom lens of claim 15, wherein the zoom lens satisfies at least either one of conditional expressions given below with respect to $f_{G12}$, fw, $f_1$, and $f_2$:

$$0.31 < fw/f_2 < 0.35 \qquad (1\text{-}3); \text{ and}$$

$$-0.15 < f_1/f_{G12} < 0\,0.10 \qquad (2\text{-}2).$$

18. An imaging apparatus, comprising the zoom lens of claim 15.

* * * * *